(12) United States Patent
Warren et al.

(10) Patent No.: US 10,531,772 B2
(45) Date of Patent: Jan. 14, 2020

(54) HANDHELD VACUUM CLEANER

(71) Applicant: TTI (Macao Commercial Offshore) Limited, Macau (MO)

(72) Inventors: Robert Patrick Warren, Charlotte, NC (US); Roderick Burgess, Charlotte, NC (US); Joseph M. Lehman, New Albany, OH (US); Garry Fee, Huntersville, NC (US); Michael Bloom, Charlotte, NC (US); William Jacob Kozlowski, Jr., Waxhaw, NC (US); Steven Marcus, Charlotte, NC (US)

(73) Assignee: TTI (Macao Commercial Offshore) Limited, Praia Grande, Macau (MO)

(*) Notice: Subject to any disclaimer, the term of this patent is extended or adjusted under 35 U.S.C. 154(b) by 76 days.

(21) Appl. No.: 15/488,047

(22) Filed: Apr. 14, 2017

(65) Prior Publication Data

US 2017/0296007 A1 Oct. 19, 2017

Related U.S. Application Data

(60) Provisional application No. 62/323,384, filed on Apr. 15, 2016, provisional application No. 62/361,718, (Continued)

(51) Int. Cl.
*A47L 5/24* (2006.01)
*A47L 9/28* (2006.01)
(Continued)

(52) U.S. Cl.
CPC .................. *A47L 5/24* (2013.01); *A47L 9/12* (2013.01); *A47L 9/14* (2013.01); *A47L 9/1454* (2013.01);
(Continued)

(58) Field of Classification Search
CPC ..... A47L 5/24; A47L 9/12; A47L 9/14; A47L 9/1454; A47L 9/1481; A47L 9/2842;
(Continued)

(56) References Cited

U.S. PATENT DOCUMENTS 2,564,467 A 8/1951 Cranmer
2,615,531 A 10/1952 Allen
(Continued)

FOREIGN PATENT DOCUMENTS

AU 2011265411 A1 7/2012
CH 408311 A 2/1966
(Continued)

OTHER PUBLICATIONS

Dirt Devil Hand Vac Owner's Manual for Model No. 1-500181-001, 1995, (8 pages).
(Continued)

*Primary Examiner* — Dung Van Nguyen
(74) *Attorney, Agent, or Firm* — Michael Best & Friedrich LLP

(57) ABSTRACT

A handheld vacuum cleaner including a suction inlet, a main body, a handle defined by a portion of the main body, a motor disposed within the main body operating a suction source, and a filter coupled to the main body. The filter is configured to separate debris from a flow of fluid drawn through the suction inlet. The filter includes a housing forming a first volume and a filter media forming a second inner volume. The filter media is coupled to the housing such that the first and second inner volumes together at least partially define a collection container configured to store debris separated by the filter media from the flow of fluid. The filter further includes an inlet opening that extends through the housing to provide fluid communication into the collection container such that the flow of fluid with the (Continued)

debris can flow into the collection container such that the flow of fluid with the debris can flow into the collection container and a relatively clean flow of fluid exits through the filter media.

25 Claims, 31 Drawing Sheets

Related U.S. Application Data filed on Jul. 13, 2016, provisional application No. 62/457,543, filed on Feb. 10, 2017, provisional application No. 62/457,329, filed on Feb. 10, 2017.

(51) Int. Cl.

| | | |
|---|---|---|
| A47L 9/12 | (2006.01) | |
| A47L 9/14 | (2006.01) | |
| A47L 9/32 | (2006.01) | |
| B01D 46/00 | (2006.01) | |
| B01D 46/02 | (2006.01) | |
| B01D 46/42 | (2006.01) | |
| B01D 46/52 | (2006.01) | |
| A47L 9/16 | (2006.01) | |
| A47L 11/40 | (2006.01) | |

(52) U.S. Cl.
CPC ........... *A47L 9/1481* (2013.01); *A47L 9/1683* (2013.01); *A47L 9/2842* (2013.01); *A47L 9/2857* (2013.01); *A47L 9/2884* (2013.01); *A47L 9/322* (2013.01); *A47L 11/4075* (2013.01); *B01D 46/0001* (2013.01); *B01D 46/0005* (2013.01); *B01D 46/0089* (2013.01); *B01D 46/02* (2013.01); *B01D 46/42* (2013.01); *B01D 46/4227* (2013.01); *B01D 46/4254* (2013.01); *B01D 46/4272* (2013.01); *B01D 46/521* (2013.01); *B01D 2275/203* (2013.01); *B01D 2279/55* (2013.01)

(58) Field of Classification Search
CPC ...... A47L 9/2857; A47L 9/2884; A47L 9/322; B01D 46/0001; B01D 46/0005; B01D 46/0089; B01D 46/02; B01D 46/42; B01D 46/4227; B01D 46/4254; B01D 46/4272; B01D 46/521; B01D 2275/203; B01D 2279/55

See application file for complete search history.

(56) References Cited

U.S. PATENT DOCUMENTS

| | | | |
|---|---|---|---|
| 2,729,303 | A | 1/1956 | McMahan |
| 4,073,632 | A | 2/1978 | Reinauer et al. |
| 4,276,069 | A | 6/1981 | Miller |
| 4,325,163 | A * | 4/1982 | Mattson ................ A47L 5/14 15/330 |
| D277,516 | S | 2/1985 | Hayden et al. |
| D304,250 | S | 10/1989 | Hassel et al. |
| 6,029,309 | A | 3/2000 | Imamura |
| 6,058,560 | A | 5/2000 | Gab et al. |
| 6,237,648 | B1 | 5/2001 | Busacca et al. |
| 6,256,834 | B1 | 7/2001 | Meijer et al. |
| D449,138 | S | 10/2001 | Dodson et al. |
| 6,571,422 | B1 | 6/2003 | Gordon et al. |
| 6,871,679 | B2 | 3/2005 | Last |
| 7,143,467 | B2 | 12/2006 | Seith |
| D544,347 | S | 6/2007 | Last |
| 7,237,298 | B2 | 7/2007 | Reindle et al. |
| 7,254,865 | B2 | 8/2007 | Bosses |
| D551,078 | S | 9/2007 | Last |
| 7,310,854 | B2 | 12/2007 | Nam et al. |
| 7,325,272 | B2 | 2/2008 | Bosses |
| 7,424,766 | B2 | 9/2008 | Reindle et al. |
| 7,468,083 | B2 | 12/2008 | Davis et al. |
| 7,509,707 | B2 | 3/2009 | Pullins |
| 7,599,758 | B2 | 10/2009 | Reindle et al. |
| 7,673,368 | B2 | 3/2010 | Cloud, III |
| 7,770,253 | B2 | 8/2010 | Ha et al. |
| 7,785,396 | B2 | 8/2010 | Hwang et al. |
| 7,823,249 | B2 | 11/2010 | Zahuranec et al. |
| D635,728 | S | 4/2011 | Fjellman |
| 7,958,598 | B2 | 6/2011 | Yun et al. |
| 7,998,234 | B2 | 8/2011 | Hwang et al. |
| 8,012,250 | B2 | 9/2011 | Hwang et al. |
| 8,021,452 | B2 | 9/2011 | Hwang et al. |
| 8,043,397 | B2 | 10/2011 | Hwang et al. |
| 8,043,410 | B2 | 10/2011 | Hwang et al. |
| 8,060,979 | B2 | 11/2011 | Hwang et al. |
| 8,092,562 | B2 | 1/2012 | Sauer et al. |
| 8,099,825 | B2 | 1/2012 | Zahuranec et al. |
| 8,240,001 | B2 | 8/2012 | Hwang et al. |
| D668,824 | S | 10/2012 | Miers |
| 8,286,299 | B2 | 10/2012 | Williams et al. |
| 8,302,250 | B2 * | 11/2012 | Dyson ................ A47L 5/24 15/327.1 |
| 8,312,593 | B2 | 11/2012 | Hwang et al. |
| 8,404,034 | B2 | 3/2013 | Hwang et al. |
| D682,694 | S | 5/2013 | van den Hoonaard |
| 8,449,639 | B2 | 5/2013 | Sauer et al. |
| 8,460,256 | B2 | 6/2013 | Michaels et al. |
| D687,719 | S | 8/2013 | Last |
| 8,661,610 | B2 | 3/2014 | Lui et al. |
| D703,890 | S | 4/2014 | Shin et al. |
| 8,689,398 | B2 | 4/2014 | Chung et al. |
| D704,058 | S | 5/2014 | Last |
| D704,556 | S | 5/2014 | van den Hoonaard |
| 8,726,457 | B2 | 5/2014 | Liu et al. |
| 8,726,459 | B2 | 5/2014 | Yun et al. |
| 8,794,488 | B2 | 8/2014 | van der Molen |
| 8,806,705 | B2 | 8/2014 | Minor et al. |
| 8,893,912 | B2 | 11/2014 | Van Der Molen et al. |
| 8,916,002 | B1 * | 12/2014 | Landolt ................ A01G 1/125 134/21 |
| 8,939,302 | B2 | 1/2015 | Last et al. |
| 8,950,939 | B2 | 2/2015 | Last et al. |
| 9,015,897 | B2 | 4/2015 | Jonsson et al. |
| D731,136 | S | 6/2015 | Yun et al. |
| D731,720 | S | 6/2015 | Gidwell et al. |
| D731,724 | S | 6/2015 | Cheon et al. |
| 9,113,764 | B2 | 8/2015 | Theising |
| D738,584 | S | 9/2015 | Niedzwecki |
| 9,138,113 | B2 * | 9/2015 | Nesom ................ A01G 20/43 |
| 9,145,237 | B2 | 9/2015 | van der Molen |
| D742,083 | S | 10/2015 | Gidwell et al. |
| 9,232,879 | B2 | 1/2016 | Schultink et al. |
| D770,111 | S | 10/2016 | Lee et al. |
| D771,890 | S | 11/2016 | Kim |
| D772,512 | S | 11/2016 | Yoon et al. |
| D774,260 | S | 12/2016 | Manning |
| D775,772 | S | 1/2017 | Lee et al. |
| D792,665 | S | 7/2017 | Salagnac |
| D798,009 | S | 9/2017 | Salagnac |
| D799,767 | S | 10/2017 | Palladino et al. |
| D800,977 | S | 10/2017 | Dammkoehler et al. |
| D800,978 | S | 10/2017 | Dammkoehler et al. |
| D800,980 | S | 10/2017 | Carter et al. |
| D804,114 | S | 11/2017 | Kim et al. |
| 2005/0091784 | A1 | 5/2005 | Bone |
| 2005/0183230 | A1 | 8/2005 | Uehigashi |
| 2005/0273968 | A1 | 12/2005 | Seith |
| 2006/0242787 | A1 | 11/2006 | Bosses |
| 2007/0214597 | A1 | 9/2007 | Suzuki |
| 2008/0134461 | A1 | 6/2008 | Hedelund Nielsen |
| 2009/0139048 | A1 * | 6/2009 | Williams ............. B23D 59/006 15/347 |
| 2009/0241285 | A1 * | 10/2009 | Hinklin ................ A47L 5/14 15/330 |
| 2010/0230410 | A1 | 9/2010 | Last et al. |
| 2010/0293742 | A1 | 11/2010 | Chung et al. |
| 2011/0232687 | A1 | 9/2011 | Stein |

(56) References Cited

U.S. PATENT DOCUMENTS

| | | | |
|---|---|---|---|
| 2012/0152280 A1 | 6/2012 | Bosses et al. | |
| 2012/0261441 A1 | 10/2012 | van den Hoonaard | |
| 2012/0267891 A1 | 10/2012 | Walz et al. | |
| 2013/0185892 A1* | 7/2013 | Walker | A47L 5/14 15/330 |
| 2013/0199662 A1 | 8/2013 | Gebbink et al. | |
| 2014/0144865 A1 | 5/2014 | Last | |
| 2016/0051109 A1 | 2/2016 | Hwang et al. | |
| 2017/0000305 A1 | 1/2017 | Gordon et al. | |
| 2017/0258282 A1* | 9/2017 | Shinagawa | A47L 9/1409 |

FOREIGN PATENT DOCUMENTS

| | | |
|---|---|---|
| CN | 1090469 C | 9/2002 |
| CN | 2527215 | 12/2002 |
| CN | 2527215 Y | 12/2002 |
| CN | 2528381 | 1/2003 |
| CN | 2528381 Y | 1/2003 |
| CN | 1463669 | 12/2003 |
| CN | 1463669 A | 12/2003 |
| CN | 100382739 | 3/2005 |
| CN | 1765306 A | 5/2006 |
| CN | 1951295 A | 4/2007 |
| CN | 1954754 A | 5/2007 |
| CN | 1954766 A | 5/2007 |
| CN | 1973749 A | 6/2007 |
| CN | 201015573 | 2/2008 |
| CN | 201015573 Y | 2/2008 |
| CN | 100374062 C | 3/2008 |
| CN | 100382739 C | 4/2008 |
| CN | 101229029 A | 7/2008 |
| CN | 201153911 | 11/2008 |
| CN | 201153911 Y | 11/2008 |
| CN | 101313832 | 12/2008 |
| CN | 101313832 A | 12/2008 |
| CN | 201167925 | 12/2008 |
| CN | 201167925 Y | 12/2008 |
| CN | 100450412 A | 1/2009 |
| CN | 101387876 A | 3/2009 |
| CN | 101558970 A | 10/2009 |
| CN | 101558976 A | 10/2009 |
| CN | 100571593 C | 12/2009 |
| CN | 101596086 | 12/2009 |
| CN | 101596086 A | 12/2009 |
| CN | 101612016 A | 12/2009 |
| CN | 101756674 | 6/2010 |
| CN | 101756674 A | 6/2010 |
| CN | 101822508 | 9/2010 |
| CN | 101822508 A | 9/2010 |
| CN | 101945607 A | 1/2011 |
| CN | 101953666 A | 1/2011 |
| CN | 201734660 | 2/2011 |
| CN | 201734660 U | 2/2011 |
| CN | 102068220 A | 5/2011 |
| CN | 102256524 A | 11/2011 |
| CN | 102599857 | 7/2012 |
| CN | 102599857 A | 7/2012 |
| CN | 202288130 | 7/2012 |
| CN | 202288130 U | 7/2012 |
| CN | 202526083 | 11/2012 |
| CN | 202526083 U | 11/2012 |
| CN | 103037746 A | 4/2013 |
| CN | 202932857 | 5/2013 |
| CN | 202932857 U | 5/2013 |
| CN | 203138359 | 8/2013 |
| CN | 203138359 U | 8/2013 |
| CN | 203302992 | 11/2013 |
| CN | 203302992 U | 11/2013 |
| CN | 203314892 | 12/2013 |
| CN | 203314892 U | 12/2013 |
| CN | 103874446 A | 6/2014 |
| CN | 203861136 | 10/2014 |
| CN | 203861136 U | 10/2014 |
| CN | 203861137 | 10/2014 |
| CN | 203861137 U | 10/2014 |
| CN | 203885442 | 10/2014 |
| CN | 203885442 U | 10/2014 |
| CN | 203914785 | 11/2014 |
| CN | 203914785 U | 11/2014 |
| CN | 104224049 | 12/2014 |
| CN | 104224049 A | 12/2014 |
| CN | 204192519 U | 3/2015 |
| CN | 204274321 | 4/2015 |
| CN | 204274321 U | 4/2015 |
| CN | 205092625 U | 3/2016 |
| CN | 105496311 A | 4/2016 |
| CN | 105496312 A | 4/2016 |
| CN | 205162973 U | 4/2016 |
| CN | 205162975 U | 4/2016 |
| CN | 105534412 A | 5/2016 |
| CN | 105581731 A | 5/2016 |
| CN | 105595920 A | 5/2016 |
| CN | 105640438 A | 6/2016 |
| CN | 205458450 U | 8/2016 |
| CN | 205514398 U | 8/2016 |
| CN | 205514399 U | 8/2016 |
| CN | 205514400 U | 8/2016 |
| CN | 205514401 U | 8/2016 |
| CN | 205649469 U | 10/2016 |
| CN | 106175594 A | 12/2016 |
| DE | 10055926 A1 | 5/2002 |
| DE | 102007036157 A1 | 2/2009 |
| DE | 202008002310 U1 | 6/2009 |
| DE | 102008010068 A1 | 8/2009 |
| DE | 102008038893 A1 | 2/2010 |
| DE | 102009035717 A1 | 2/2011 |
| DE | 102011006542 A1 | 10/2012 |
| DE | 102011052023 A1 | 1/2013 |
| DE | 202011052208 | 3/2013 |
| DE | 202011052208 U1 | 3/2013 |
| DE | 202013100862 | 3/2013 |
| DE | 202013100862 U1 | 3/2013 |
| DE | 202013103508 | 8/2013 |
| DE | 202013103508 U1 | 8/2013 |
| DE | 102014002743 B3 | 9/2014 |
| DE | 102014109596 | 2/2015 |
| DE | 202015101218 | 4/2015 |
| DE | 202015101218 U1 | 4/2015 |
| DE | 202014100563 | 5/2015 |
| DE | 202014100563 U1 | 5/2015 |
| DE | 102014209925 A1 | 11/2015 |
| DE | 102015108462 A1 | 12/2016 |
| EP | 1836941 A2 | 9/2007 |
| EP | 1894507 A1 | 3/2008 |
| EP | 1480545 | 4/2008 |
| EP | 1480545 B1 | 4/2008 |
| EP | 1318746 | 9/2009 |
| EP | 1318746 B1 | 9/2009 |
| EP | 2380477 | 10/2011 |
| EP | 1933685 B1 | 5/2012 |
| EP | 2249688 B1 | 5/2013 |
| EP | 2378940 B1 | 5/2013 |
| EP | 1933685 | 3/2014 |
| EP | 2732747 | 5/2014 |
| EP | 2732747 A1 | 5/2014 |
| EP | 2772173 | 9/2014 |
| EP | 2772173 A1 | 9/2014 |
| EP | 2820991 A1 | 1/2015 |
| GB | 2441962 A | 3/2008 |
| WO | WO2007033977 A1 | 3/2007 |
| WO | WO2009011482 A1 | 1/2009 |
| WO | WO2016206732 A1 | 12/2016 |
| WO | WO2016096045 A1 | 1/2017 |

OTHER PUBLICATIONS

United States Patent Office Action for U.S. Appl. No. 29/600,733 dated Apr. 17, 2018 (8 pages).

United States Patent Office Action for U.S. Appl. No. 29/600,736 dated Apr. 23, 2018 (8 pages).

United States Patent Office Notice of Allowance for U.S. Appl. No. 29/600,733 dated Oct. 25, 2018 (6 pages).

(56) References Cited

OTHER PUBLICATIONS

United States Patent Office Notice of Allowance for U.S. Appl. No. 29/600,736 dated Sep. 18, 2018 (8pages).
International Search Report Report and Written Opinion for Application No. PCT/US2017/027684 dated Aug. 22, 2017 (19 pages).
International Invitation to Pay Additional Fees and Partial International Search for Application No. PCT/US2017/027671 dated Oct. 2, 2017 (15 pages).
International Search Report and Written Opinion for Application No. PCT/US2014/027671 dated Nov. 30, 2017. 22 pages.

* cited by examiner

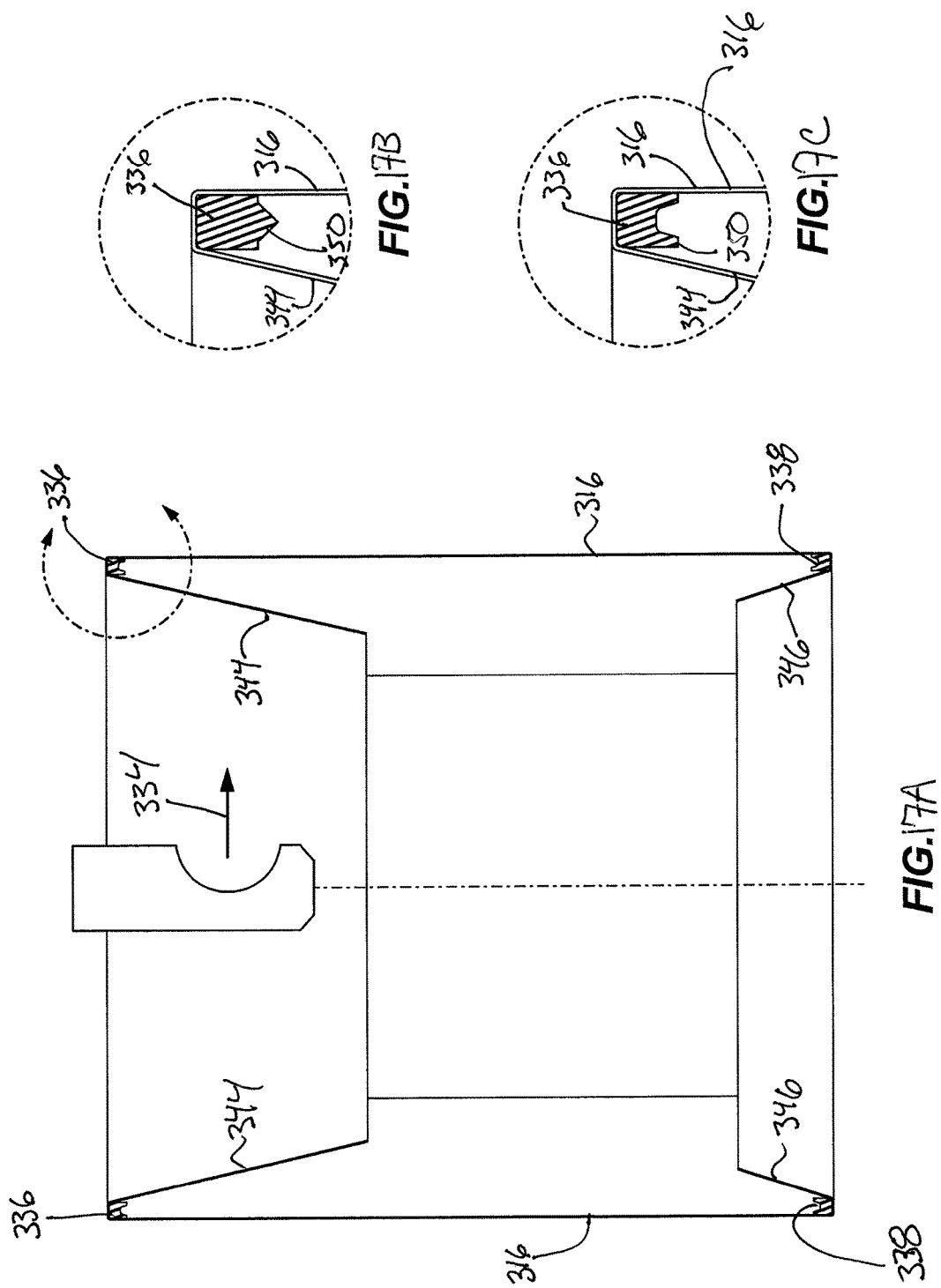

HANDHELD VACUUM CLEANER

CROSS-REFERENCE TO RELATED APPLICATIONS

This application claims priority to the following: U.S. Provisional Patent Application No. 62/323,384, filed Apr. 15, 2016, U.S. Provisional Patent Application No. 62/361,718, filed Jul. 13, 2016, U.S. Provisional Patent Application No. 62/457,329, filed Feb. 10, 2017, U.S. Provisional Patent Application No. 62/457,543, filed Feb. 10, 2017, the entire contents all of which are hereby incorporated by reference herein.

FIELD OF THE INVENTION

The present invention relates to vacuum cleaners, and more particularly, handheld vacuum cleaners.

BACKGROUND

Some types of vacuum cleaners include a filter bag for collecting and storing debris while filtering the air drawn through the vacuum with the debris. Once the bag is full, the bag is disconnected from the vacuum and replaced with a new filter. In prior vacuum cleaners, it is typically necessary for a user to touch or grasp the bag in order to disconnect the bag from the vacuum and dispose of the bag, which some consumers do not prefer because of the dirt and debris inside the bag.

SUMMARY

In one embodiment, a handheld vacuum cleaner is disclosed including a suction inlet, a main body, a handle defined by a portion of the main body, a motor disposed within the main body operating a suction source, and a filter coupled to the main body. The filter is configured to separate debris from a flow of fluid drawn through the suction inlet. The filter includes a housing forming a first volume and a filter media forming a second inner volume. The filter media is coupled to the housing such that the first and second inner volumes together at least partially define a collection container configured to store debris separated by the filter media from the flow of fluid. The filter further includes an inlet opening that extends through the housing to provide fluid communication into the collection container such that the flow of fluid with the debris can flow into the collection container such that the flow of fluid with the debris can flow into the collection container and a relatively clean flow of fluid exits through the filter media.

In another embodiment a handheld vacuum cleaner includes a suction inlet, a fan for creating suction through the suction inlet, a dirt collection container in fluid communication with the suction inlet for collecting debris, a main body, and a handle defining a portion of the main body. The handheld vacuum further includes a motor disposed within the main body, which is operable to drive the fan. The handheld vacuum further includes a battery coupled to the main body and is operable to supply power to the motor. The handheld vacuum cleaner further includes a volute surrounding the fan to direct debris from the suction inlet toward the dirt collection container.

In another embodiment, a handheld vacuum cleaner includes a suction inlet defining an inlet axis, a conduit in fluid communication with the suction inlet, and a dirt collection container for collecting debris and is connected to the conduit for collecting debris. The conduit defines a conduit axis that is transverse to the inlet axis. The handheld vacuum cleaner further includes a main body, a handle defining a portion of the main body, a motor disposed within the main body, and a battery operable to supply power to the motor. The motor defines a rotational axis that is generally aligned with the inlet axis and the battery is coupled to the main body.

Other aspects of the invention will become apparent by consideration of the detailed description and accompanying drawings.

BRIEF DESCRIPTION OF THE DRAWINGS

FIG. 17A is a cross-sectional view of the filter, illustrating the filter media of the filter without the upper and lower housing.

FIG. 17B is an enlarged view of the filter of FIG. 17A, illustrating an embodiment of an attachment member.

FIG. 17C is an enlarged view of the filter of FIG. 17A, illustrating another embodiment of an attachment member.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
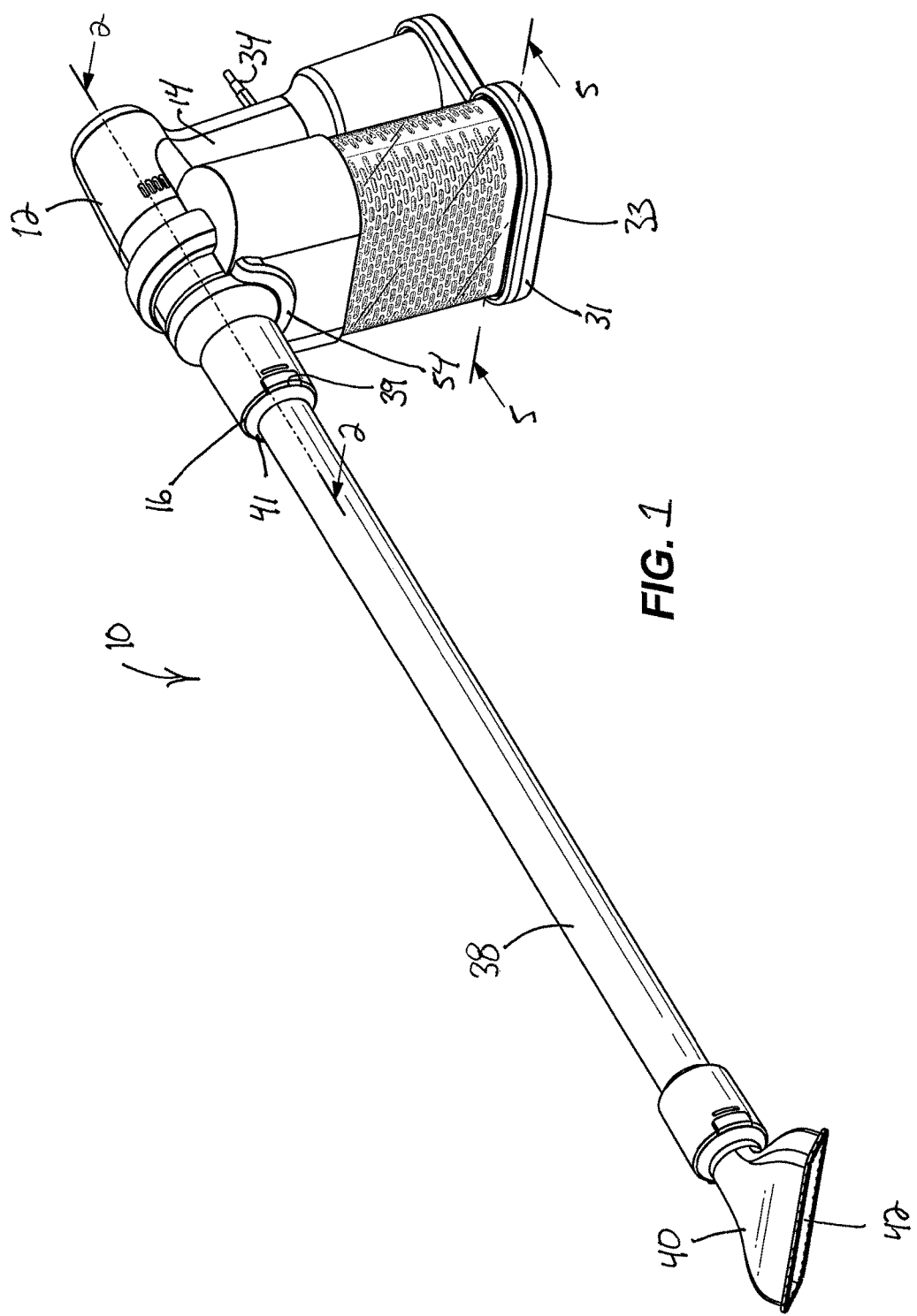
FIG. 1 is a front perspective view of a handheld vacuum cleaner according to an embodiment.
Figure 2:
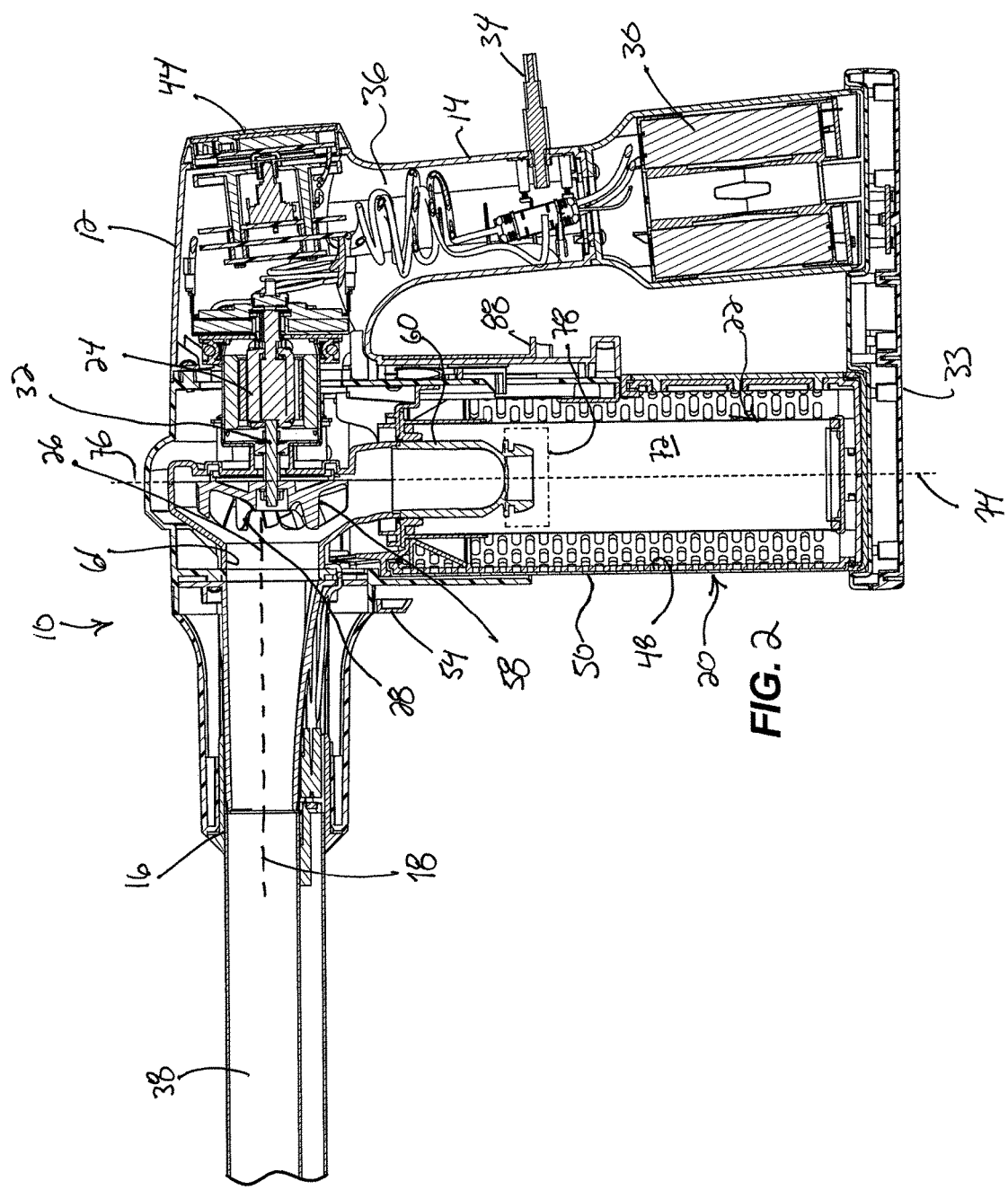
FIG. 2 is a cross-sectional view of the handheld vacuum cleaner taken along line 2-2 of FIG. 1.

FIGS. 1 and 2 illustrate a vacuum cleaner 10, such as a handheld vacuum cleaner, including a main body 12, a handle 14 defining a portion of the main body 12, and a suction inlet 16 for drawing airflow mixed with debris along an inlet axis 18 from a surface. The vacuum cleaner 10 includes a debris separator and a dirt collection container 72 in fluid communication with the suction inlet for collecting the debris. In the illustrated embodiment, the debris separator and the dirt collection container 72 are formed by a filter 22 enclosed by an outer housing 20 (FIG. 2) and releasably installed in or coupled to the main body 12. The handle 14 is grasped by an operator to operate and facilitate in maneuvering the vacuum cleaner 10 to draw in debris during a cleaning operation. The debris is directed toward and collected in the filter 22. As will be discussed in more detail below, when an operator is done cleaning, the filter 22 can be removed and disposed of without touching or handling the filter 22 and a new filter is easily loaded into the vacuum 10. Although the vacuum cleaner 10 of the illustrated embodiment is shown as a handheld vacuum, in other embodiments, the vacuum cleaner 10 may be other types of vacuums (e.g., canister vacuum, upright vacuum, backpack vacuum, robotic vacuum, etc.).

With continued reference to FIGS. 1 and 2, the vacuum cleaner 10 further includes a motor 24 having a rotational axis 26, a suction source or fan 28 operated by the motor 24, and a power supply 30 (e.g., battery or power cord) for supplying selective power to the motor 24. The motor 24 includes an output shaft 32 that is coupled to the fan 28 in order to drive the fan 28 about the rotational axis 26. In the illustrated embodiment, the rotational axis 26 is generally aligned with the inlet axis 18. In one alternative, the rotational axis and suction inlet axis are substantially co-axial. In yet another alternative, the motor 24 is positioned such that the rotational axis 26 intersects the inlet axis 18 at an angle such that the air flowing into the suction source 28 enters at an angle. The illustrated embodiment uses a battery for the power supply 30. The battery 30 is, for example, a lithium ion battery but could alternatively be other types of batteries. The battery 30 may be removable for recharging on a battery charger. Alternately or additionally, the battery 30 may be rechargeable in place when the vacuum 10 or an electrically connected storage base 31 is connected to a power cord 34 that is further plugged into a power source e.g., household power (120 volts, 230 volts, etc.). As illustrated, the battery 30 is positioned within the handle 14 and electrically connected to the motor 24 via a control circuit 36.

The vacuum cleaner 10 includes one or more bottom surfaces 33 upon which the vacuum cleaner is configured to be positioned on a horizontal surface. In the illustrated embodiment, the bottom surface 33 is formed by the outer housing 20 and the handle 14. Alternatively, the main body 12 is configured with the bottom surface 33.

Optionally, the vacuum cleaner 10 includes an accessory tool 38 such as a wand for cleaning surfaces. When connected to the suction inlet 16, the accessory tool 38 is in communication with the fan 28. While in use and attached to the suction inlet 16, an operator can grip the handle 14, the accessory tool 38, or both to move the vacuum cleaner 10 for cleaning. In the illustrated embodiment, the accessory tool 38 includes a cleaning head 40 accessory tool with an intake nozzle 42 that operates as a suction nozzle when connected to the suction inlet 16 for drawing debris from a surface. The cleaning head 40 accessory tool of the illustrated embodiment is usable with or without the wand 38 and is removable from the suction inlet 16 such that different cleaning heads can be used to clean surfaces (e.g., furniture, drapes, steps, etc.).

Figure 3:
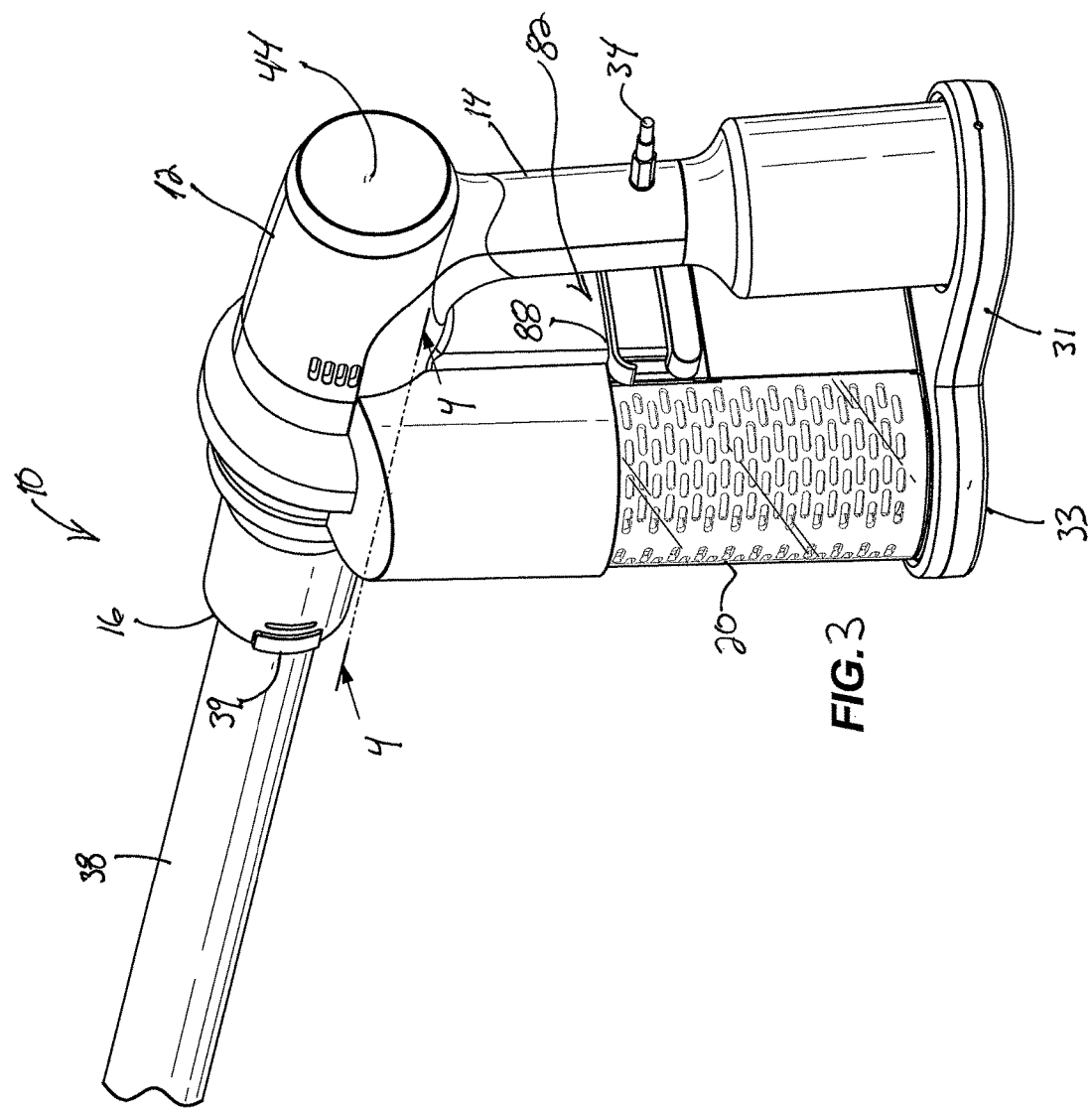
FIG. 3 is a rear perspective view of the handheld vacuum cleaner of FIG. 1.

With reference to FIGS. 2 and 3, the vacuum cleaner 10 further includes a user interface 44 disposed on the main body 12 adjacent the handle 14 positioned on a user-facing surface. The user interface 44 may be adjacent the handle 14 such that a user can operate the user interface 44 with the same hand that is grasping the handle 14 and so that the user interface is in the line of sight of the user when grasping the handle 14 and using the vacuum cleaner 10. The user interface 44 may include a dial. Alternatively or additionally, the user interface 44 may include a button, switch, touch screen, or other user-manipulative interface. In the illustrated embodiment, the user interface 44 includes a display operable to display information to the user, including filter fill level. The user interface 44 is electrically connected to the battery 30 and the control circuit 36 and is connected to and operable to control and display information about features of the vacuum cleaner 10, including the motor 24 and filter 22 via the control circuit 36. As such, the control circuit 36 controls the amount of suction the fan 28 produces by controlling the amount of power the battery 30 supplies to the motor 24 based on user input via the user interface 44, for example, including a low power setting or a high power setting. The user interface 44 may be connected to and operable to control and display information about features on attached accessory tools, such as brush motors or sensors. The user interface 44 may also display other features during a vacuuming operation. For example, the user interface 44 may indicate to a user the capacity for debris in the filter 22, the amount of electrical charge remaining in the battery 30, brushroll speed in a connected accessory, and other features. As illustrated, the user interface 44 includes a dial that rotates around an axis generally along the suction inlet 16.

Figure 4:
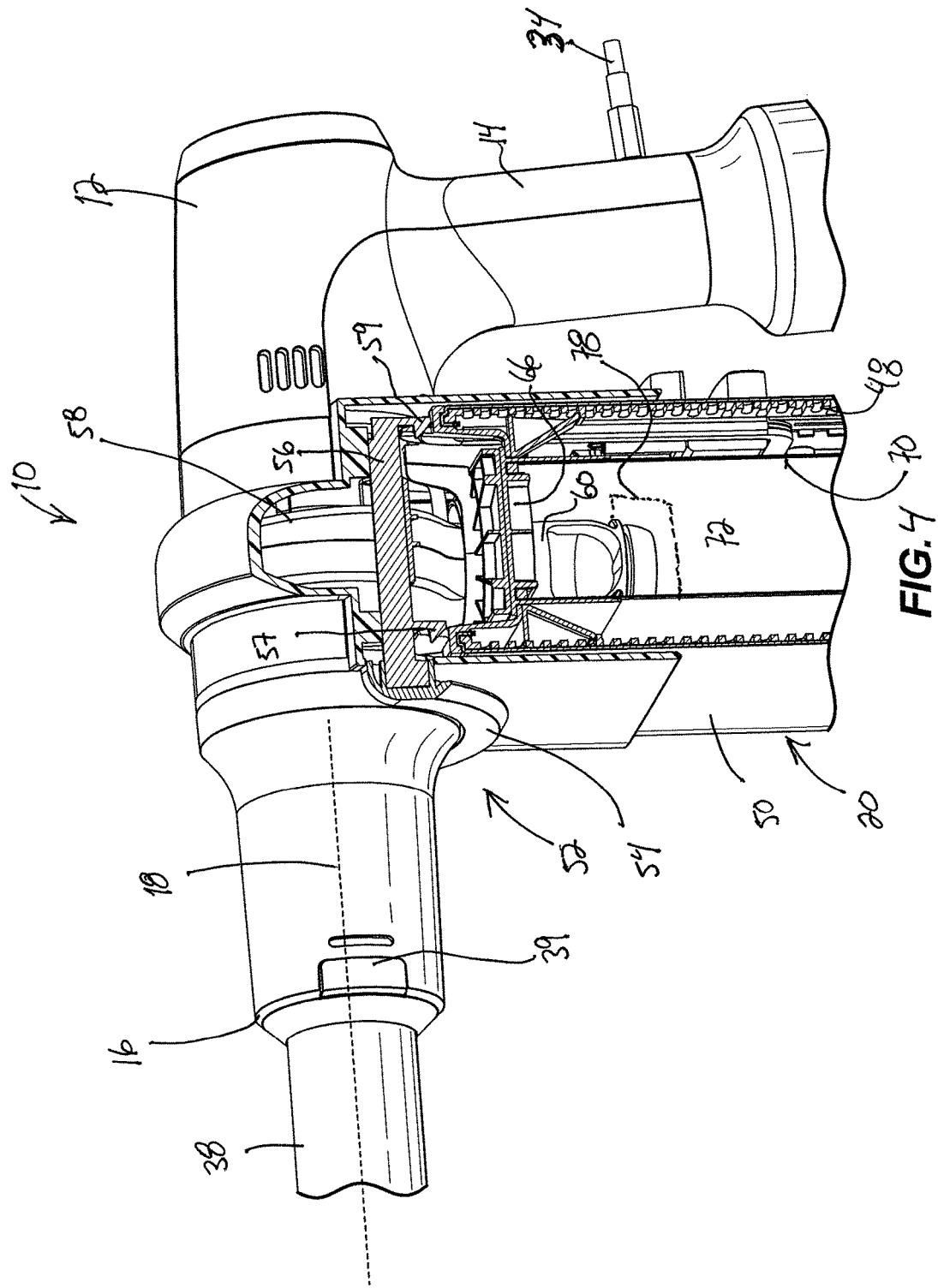
FIG. 4 is a cross-sectional view of the handheld vacuum cleaner taken along line 4-4 of FIG. 3.

With reference to FIG. 4, outer housing 20 surrounds the filter 22. In the illustrated embodiment, the outer housing 20 includes a porous structure 48 and a mesh fabric 50 that allows airflow leaving the filter 22 to exhaust through the porous structure 48 and the mesh fabric 50. In this embodiment, the porous structure of the outer housing 20 forms the air exhaust outlet for the vacuum cleaner 10. In alternative embodiments, the outer housing 20 is substantially impervious to airflow, and the airflow is ducted to an outlet formed by vents, louvers, apertures, or other opening. The vacuum cleaner 10 further includes a housing release mechanism 52 for selectively coupling the outer housing 20 to the main body 12. Specifically, the housing release mechanism 52 is capable of uncoupling the outer housing 20 from the main body 12. The housing release mechanism 52 includes an actuator 54 and a locking member 56 that is actuated by the actuator 54. In the illustrated embodiment, the actuator 54 is moveable with the locking members 56 and moveable along a direction parallel to the inlet axis 18 between a locked position (as shown in FIG. 4) and an unlocked position. In the locked position, the locking member 56 engages the outer housing 20 to couple the outer housing 20 to the main body 12. In the unlocked position, the locking member 56 disengages the outer housing 20 to uncouple the outer housing 20 from the main body 12. In the illustrated embodiment, the locking member 56 includes a first lock 57 and a second lock 59. The first lock 57 engages corresponding features connecting a first portion of the outer housing 20, such as a front wall, and the second lock 59 engages corresponding features connecting a second portion of the outer housing 20, such as a rear wall. As shown in FIG. 4, the locking member 56 is configured with the first lock 57 being in a spaced relationship with the second lock 59 spanning between the first portion of the outer housing 20 and the second portion of the outer housing 20. The actuator 54 actuates both the first lock 57 and the second lock 59.

Figure 5:
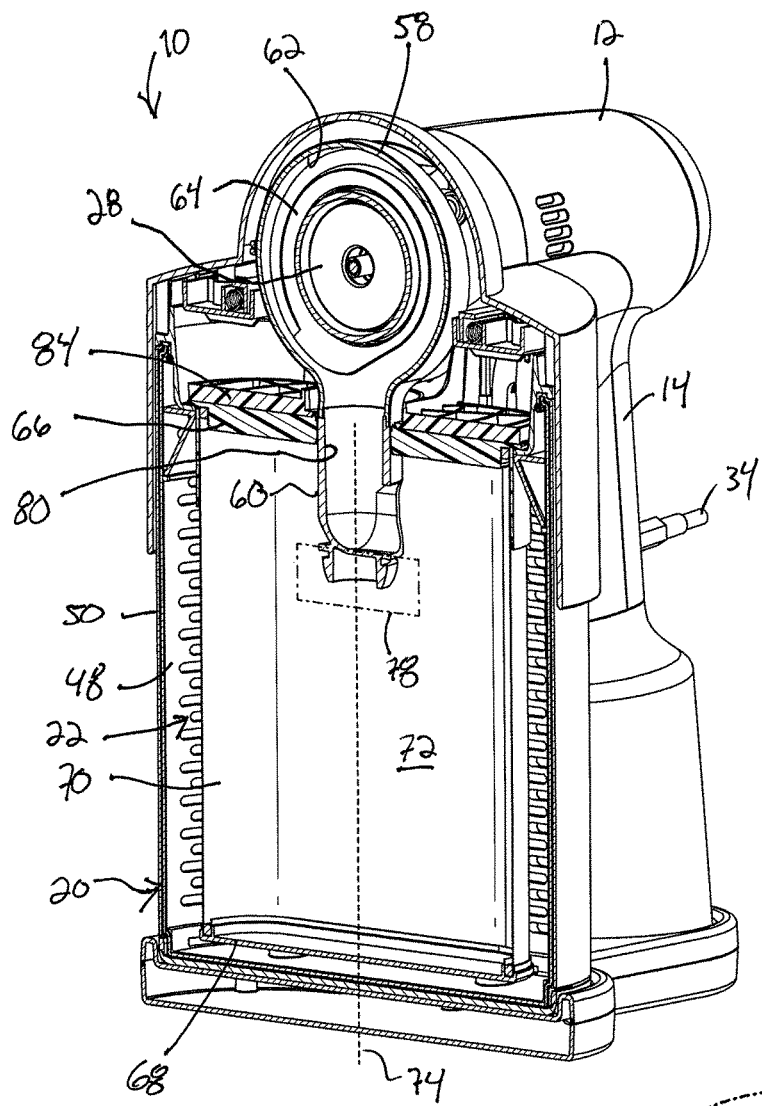
FIG. 5 is a cross-sectional view of the handheld vacuum cleaner taken along line 5-5 of FIG. 1, illustrating a filter coupled to the handheld vacuum cleaner.

With reference to FIG. 5, the vacuum cleaner 10 further includes a conduit 60 connected to the dirt collection container 72 and in fluid communication with the suction inlet 16 configured for directing airflow from the suction inlet 16 into the dirt collection container 72. In the illustrated embodiment, the conduit 60 extends into the collection container 72. The vacuum cleaner 10 further includes a scroll or volute 58 disposed between the suction inlet 16 and the conduit 60. The volute 58 includes a volute inlet 61, as shown in FIG. 2. In the illustrated embodiment, the volute inlet 61 is aligned with the suction inlet 16. In one alternative, the volute inlet 61 is coaxial with the suction inlet 16. The volute 58 further includes an inner periphery 62 that is spaced circumferentially away from an outer periphery 64 of the fan 28. That is, the volute 58 forms an airflow housing surrounding the fan 28. As such, the volute 58 is capable of directing air and debris traveling from the suction inlet 16, through the airflow housing surrounding the fan 28, and toward the conduit 60. In turn, the conduit 60 directs debris toward the filter 22. The conduit 60 extends from the volute 58 generally along a plane 76 defined by the fan 28 (FIG. 2). As illustrated, the suction inlet axis 18 is transverse to the plane 76 defined by the fan 28, and transverse to the conduit 60. As such, the handle 14 is arranged transverse to the suction inlet axis 18, and generally along the plane 76 defined by the fan 28. In the illustrated embodiment, the conduit 60 is generally vertical when the bottom surface of the vacuum cleaner 10 is positioned on a horizontal surface.

Figure 6:
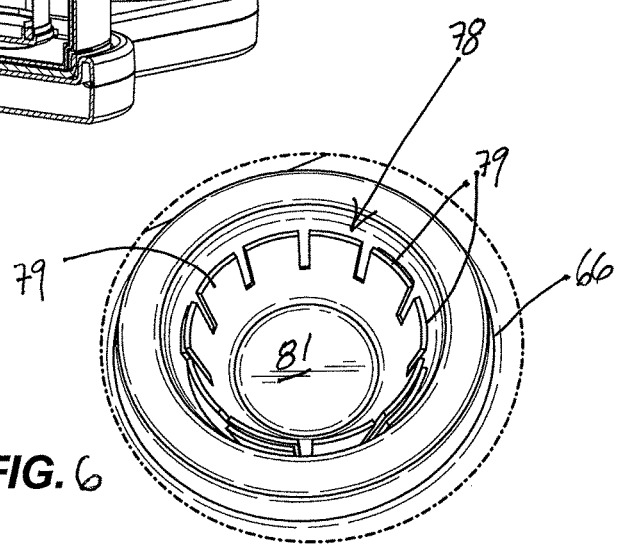
FIG. 6 is a perspective view of the filter, illustrating a valve seated within an inlet opening of the filter.

With reference to FIG. 6, the vacuum 10 further includes an aperture 63 may be provided through the inner periphery of the volute 58, the airflow housing surrounding the fan 28, the conduit 60, or other location in the airflow system and connected to a pressure sensor. The pressure sensor provides a pressure signal to the control circuit 36 corresponding to the system pressure at the aperture 63. When the pressure signal indicates that pressure at the aperture 63 reaches a predetermined threshold value, the control circuit 36 indicates to the user that the filter 22 is full or the system is clogged, or the control circuit 36 may turn off the motor 24 or take other action. In various alternatives, a plurality of predetermined threshold values may be provided whereby the control circuit 36 takes different actions depending upon the threshold; for example, the control circuit 36 indicates to the user that the filter 22 is full at a first threshold, the control circuit 36 indicates to the user that the vacuum 10 is clogged at a second threshold, and the control circuit 36 turns off the motor 24 at a third threshold.

With continued reference to FIG. 5, the filter 22 of the illustrated embodiment is operably installed, or coupled, in the main body 12 and configured to separate debris from an airflow drawn through the suction inlet 16. An unused filter 22 may be provided in a collapsed position in the form of a pod or cartridge. In the illustrated embodiment, the filter 22 is formed by an upper housing 66 and a lower housing 68, and a filter media 70 interconnecting the upper housing 66 and the lower housing 68. The housings 66, 68 and the filter media 70 define the dirt collection container 72 (FIG. 5) in which the debris is collected. Specifically, the dirt collection container 72 is formed by an inner volume of each of the housings 66, 68 and an inner volume of the filter media 70. The inner volumes of the upper housing 66 and the lower housing 68 can be equal or one of the volumes can be greater than the other. In various alternatives, the inner volumes of one or both of the upper housing 66 and the lower housing 68 are small or inappreciable relative to the inner volume of the filter media 70 due to the shape of the housing 66, 68. The upper housing 66 and the lower housing 68 can be formed from any suitable material, such as thermoplastic material, thermoset material, molded paper pulp, formed or molded filter media, or any other suitable material. In one embodiment the filter media 70 includes a nonwoven, HEPA filter material. The filter 22 is expandable from the collapsed position (not shown) and an expanded position (FIG. 5). Optionally, in the collapsed position, the lower housing 68 engages the upper housing 66, and the filter media 70 is encased by the upper and lower housings 66, 68. This provides a convenient way for the filter 22 to be stored, shipped, etc. In the expanded position, the lower housing 68 is released from the upper housing 66 and the filter media 70 is fully expanded. The filter 22 moves between the collapsed position and the extended position along a dirt collection axis 74. As illustrated, the dirt collection axis 74 is generally aligned with the plane 76 defined by the fan 28 (FIG. 2), and the dirt collection axis 74 is generally aligned with the conduit 60. In various alternatives, the dirt collection axis 74 and conduit 60 are not aligned, and may be transverse.

With reference to FIGS. 5 and 6, the filter 22 further includes a valve 78 releasably connected to an inlet opening 80. Specifically, the upper housing 66 includes an inlet port forming the inlet opening 80 that allows debris to enter the collection container 72. As a result, the airflow with the debris can flow into the collection container 72 and a relatively clean flow of fluid exits through the filter media 70. The valve 78 is operable to selectively close the filter 22 from entry/discharge of any debris. When the filter 22 is de-coupled from the vacuum cleaner 10, the valve 78 is seated (FIG. 6) within the inlet opening 80. Consequently, fluid and particles are inhibited from entering or leaving the interior of the filter 22. When the filter 22 is coupled to the vacuum cleaner 10, the valve 78 is opened, thereby unseating the valve 78 from the inlet opening 80. As shown in FIG. 5, the valve 78 couples to the end of the conduit 60 when the filter 22 is coupled to the vacuum cleaner 10.

In the illustrated embodiment, a method of coupling the filter 22 to the vacuum cleaner 10 includes separating the outer housing 20 from the main body 12 and positioning the filter 22 in the outer housing 20. The outer housing 20 includes a shoulder 85 or other retaining feature configured to receive and locate the filter 22 in an installed orientation within the outer housing 20. In the illustrated embodiment, the method of coupling the filter 22 to the vacuum cleaner 10 further includes moving the outer housing 20 with positioned filter 22 in a direction generally along the dirt collection axis 74 coupling the outer housing 20 and filter 22 to the main body 12. The filter 22 in the installed orientation within the outer housing 20 is aligned with the conduit 60 such that moving the outer housing 20 and filter 22 toward the main body 12 along the dirt collection axis 74 during coupling causes the conduit 60 to extend into the filter 22 through the inlet opening 80 thereby unseating the valve 78 and connecting the conduit 60 to the dirt collection container 72.

With continued reference to FIGS. 5 and 6, the valve 78 includes a plurality of flexible fingers 79. The flexible fingers 79 engage the upper housing 66 around the inlet opening 80 retaining the valve 78 within the inlet opening 80. When the valve 78 is unseated, the flexible fingers 79 of the valve 78 release from the inlet opening 80, thereby opening the inlet opening 80 to provide fluid communication between the inlet opening 80 and the collection container 72. In other embodiments, the releasable connection between the valve 78 and the inlet opening 80 may be a variety of other connections (e.g., springs, snaps, tape, clips, friction fit, etc.). In the illustrated embodiment, the valve 78 connects to the conduit 60 when the valve is unseated to hold the valve 78 on the conduit 60 while the valve 78 is open. The valve 78 may include a pocket 81. When the conduit 60 contacts the valve 78 with a sufficient force, corresponding features on the conduit 60 enter and couple to the pocket 81 (via the flexible fingers 79) connecting the valve 78 to the conduit 60. The connection of the valve 78 to the conduit 60 is such that the valve 78 remains on the conduit 60 until a predetermined valve-removal force is applied to the valve 78. The valve 78 may be retained on the conduit 60 using any interlocking or connecting features. In alternative embodiments, the valve 78 is not connected to the conduit 60, but is held to the upper housing 66 by a spring, hinge, tether, or other connection that allows the conduit 60 to open the inlet opening 80. In yet another alternative, the inlet opening 80 is not provided with a valve or is provided by a user-actuated closure such as a cover. A seal may be provided between the valve 78 and upper housing 66 at the inlet 80. The seal may be an o-ring. Alternatively, the seal may be a resilient material such as a gasket or molded sealing surface. In various alternatives, the valve may seal the inlet in an airtight closure. In other alternatives, the seal of the valve closure may not be airtight but inhibiting dust release as desired for an application.

Figure 7:
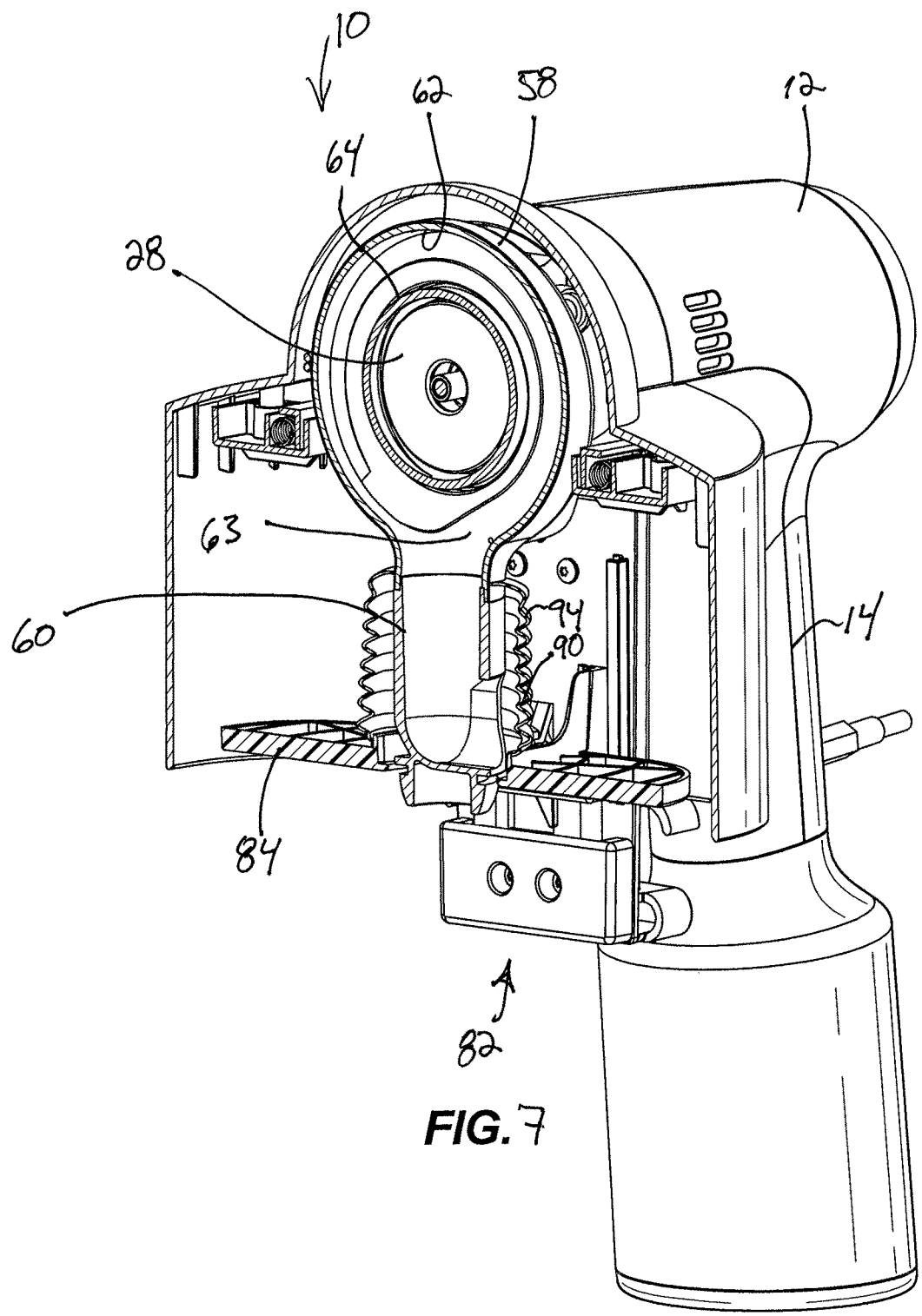
FIG. 7 is a cross-sectional view of the handheld vacuum cleaner taken along line 5-5 of FIG. 1, illustrating the filter removed from the handheld vacuum cleaner.
Figure 8:
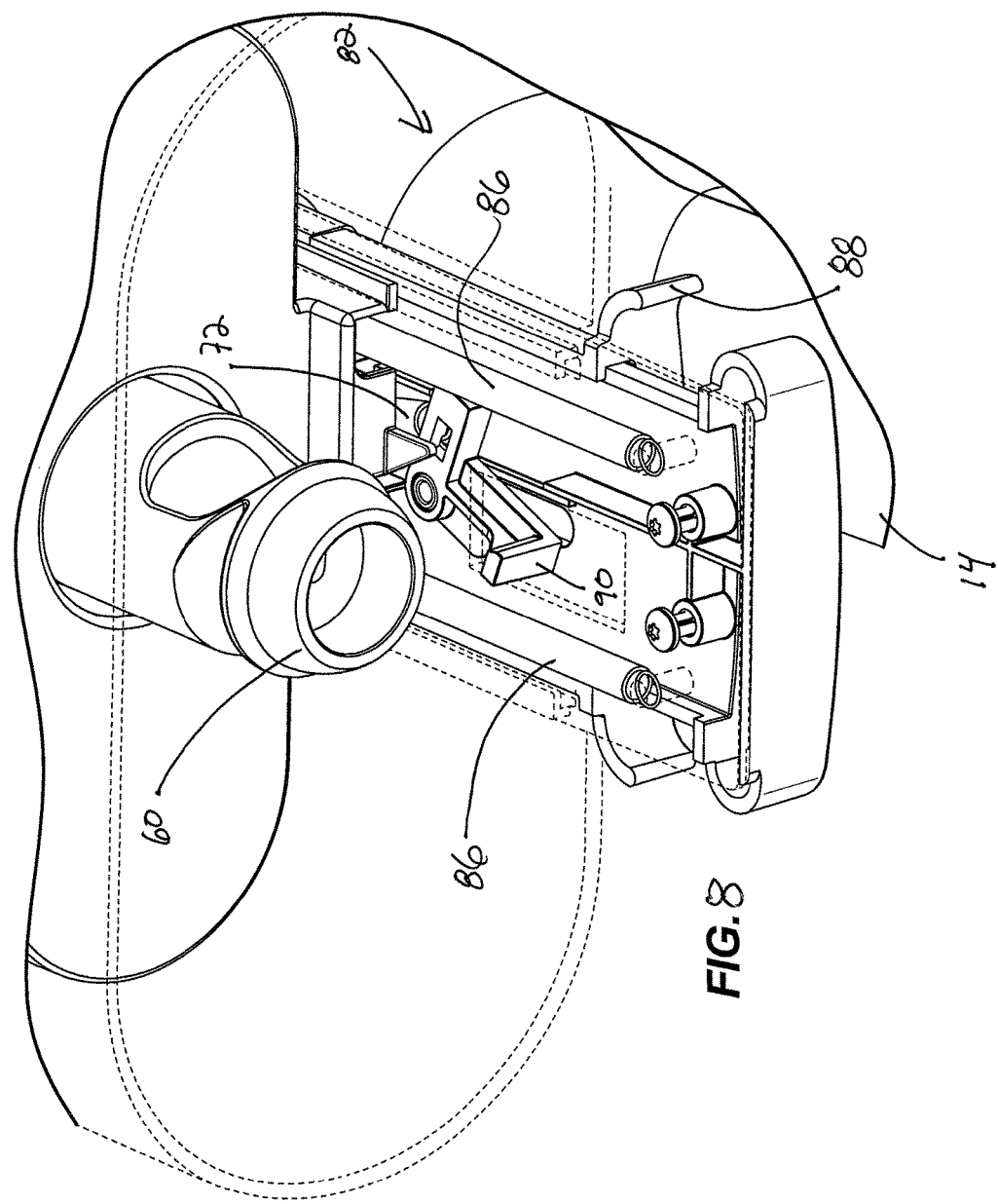
FIG. 8 is an enlarged perspective view of the handheld vacuum cleaner, illustrating filter release mechanism.

With reference to FIGS. 5-7, the vacuum cleaner 10 further includes a filter release mechanism 82 having a collar 84 slidably coupled to the vacuum 10 between an extended position (FIG. 6) and a retracted position (FIG. 5). The collar 84 is pressed by springs 86 toward the extended position. When the filter 22 is inserted into the outer housing 20, the upper housing 66 abuts the collar 84 moving the collar 84 from the extended to the retracted position. Thus, as the outer housing 20 is coupled to the main body 12, the collar 84 is forced toward the retracted position since the shoulder 85 maintains the position of the upper housing 66 relative to the housing 20 in the filter's installed orientation within the outer housing 20. In the illustrated embodiment, the springs 86 are selected to provide a pressing force that is less than the valve-removal force needed to release the valve 78 from the conduit 60. When the outer housing 20 is separated from the main body 12, the springs 86 of the collar 84 urge the filter 22 in the direction of the extended position until the filter upper housing 66 is contacting and retained by the valve 78 connected to the conduit 60. As such, the outer housing 20 is removed from the vacuum cleaner 10 while the filter 22 remains connected to the conduit 60 by the engagement of the valve 78 to the conduit 60. The filter release mechanism 82 is operable to provide a pressing force greater than the valve-removal force to release the valve 78 from the conduit 60 further urging the filter 22 off the remaining portion of the conduit 60, as explained in more detail below.

As shown in FIG. 7, the filter release mechanism 82 further includes an actuator 88 slidably coupled to the vacuum 10 and a pusher 90 (FIG. 7) pivotably coupled to the actuator 88. The actuator 88 is configured to be operated by a user between a rest position (FIG. 3), an intermediate position (moved slightly downward from the rest position and generally corresponding to the position of the filter upper housing 66 contacting and retained by the valve 78 connected to the conduit 60), and an extended position (moved further downward from the intermediate position and generally corresponding to the position of the filter upper housing 66 and valve 78 being released from the conduit 60). The pusher 90 moves between a first or vertical position (not shown) when the actuator 88 is in its intermediate and extended positions and a second or angled position (FIG. 7) when the actuator 88 is moving toward its rest position. When a user moves the actuator 88 from the rest position to the intermediate position, the pusher 90 moves to the first position and is located adjacent the upper housing 66 of the filter 22. When a user moves the actuator 88 from the intermediate position to the extended position applying a user-applied force greater than the valve-removal force, the pusher 90 passes through a slot in the collar 84 and exerts a force against the upper housing 66 to release the upper housing 66 and valve 78 from the conduit 60. In an alternative embodiment, the pusher 90 is adjacent the collar 84 when the actuator 88 is in the intermediate position, and moving the actuator 88 to the extended position causes the pusher 90 to press the collar 84 against the upper housing 66 to release the upper housing 66 from the conduit 60. The pusher 90 is moved via a spring 92 toward the first position as the actuator 88 moves to its intermediate and extended positions.

The vacuum cleaner 10 of the illustrated embodiment further includes a sleeve 94 (FIG. 6) that covers the conduit 60 when the collar 84 is in the extended position. Specifically, the sleeve 94 covers the conduit 60 when the filter 22 is removed from the conduit 60. As such, the sleeve 94 inhibits dirt from falling out of the conduit 60 when the filter 22 is removed from the vacuum 10. In some cases, the sleeve 94 is a flexible bellow-type sleeve that moves in response to movement of the collar 84.

In operation, the filter 22 is placed within the outer housing 20 and the outer housing 20 is then coupled to the main body 12. As the outer housing 20 is coupled to the main body 12, the upper housing 66 of the filter 22 abuts the collar 84 and the collar 84 is forced upward (toward the retracted position) and the inlet opening 80 receives the conduit 60. As the conduit 60 engages the valve 78 as the conduit 60 extends into the dirt collection container 72, the valve 78 is unseated from the inlet opening 80 and coupled to the end of the conduit 60, as shown in FIG. 5. Once the filter 22 is full of debris, an operator removes the filter 22 from the vacuum 10 without an operator touching the filter 22. Specifically, the operator releases and separates the outer housing 20 from the main body 12. As the outer housing 20 separates from the main body 12, the springs 86 urge the collar 84 downward, thereby exerting a force on the upper housing 66 of the filter 22 toward the collar extended position. The valve 78 being coupled to the conduit 60 retains the upper housing 66 on the conduit 60. At this point, an operator moves the actuator 88 downward in order to pivot the pusher 90 from the second position toward the first position and enables the operator to exert a force greater than the valve-removal force. As such, the pusher 90 exerts the valve-removal force on the collar 84 or upper housing 66 of the filter 22 sufficient to re-seat the valve 78 into the inlet opening 80 of the filter 22 and eject the filter 22 from the conduit 60. The sleeve 94 covers the conduit 60 when the filter 22 is removed from the conduit 60 to ensure that debris remaining in the conduit 60 (if any) does not inadvertently fall out.

In the illustrated embodiment, the conduit 60 is fixed relative to the main body 12, and the outer housing 20 and the filter 22 are movable and releasable relative to the main body 12. It will be appreciated that in alternative constructions the conduit 60 may be movable relative to the main body 12 such that the conduit 60 moves at least partially into engagement with the filter 22. Alternatively or additionally, in various embodiments the conduit 60 may not extend into the dirt collection container 72 but instead abuts the inlet opening 80 on the filter 22 to direct air and debris into the dirt collection container 72.

In the illustrated embodiment, the outer housing 20 is removable from the vacuum cleaner 10 while the filter 22 remains connected to the conduit 60, the filter 22 being subsequently releasable from the conduit 60 after the outer housing 20 is removed. In one alternative, the filter 22 and the outer housing 20 are connected together such that the outer housing 20 is not removable from the vacuum cleaner 10 without the filter 22. In this alternative embodiment, the actuation of the housing release mechanism 52 uncouples the outer housing 20 and the collar 84 urges the filter 22 and the outer housing 20 together in the direction of the extended position until the filter upper housing 66 is contacting and retained by the valve 78 connected to the conduit 60. The outer housing 20 and the filter 22 together remain connected to the conduit 60 by the engagement of the valve 78 until a user grasps the outer housing 20 and pulls it away from the main body 12 with sufficient force to release the valve 78 from the conduit 60, thereby reseating the valve 78 in the inlet opening 80. Optionally, the filter release mechanism 82 may be provided in this alternative embodiment providing a mechanism for releasing the filter 22 and outer housing 20 from the conduit 60.

In the illustrated embodiment, the suction source 28 is provided between the suction inlet 16 and the filter 22 such that the airflow mixed with debris passes through the suction source 28 en route to the filter 22 arranged as a "dirty air" system. It will be appreciated that in alternative constructions the suction source 28 could be provided downstream of the filter 22 arranged as a "clean air" system.

As shown in FIGS. 1 and 3, the accessory tool 38, such as a wand, is connectable to the suction inlet 16. The accessory tool 38 may be retained in the suction inlet by friction, or by one or more latches. In the illustrated embodiment, the accessory tool 38 is retained in the suction inlet 16 by two latches 39, 41 positioned on opposite sides of the suction inlet 16. Each latch 39, 41 is releasable by pressing the latch 39, 41 toward the wand 38. By positioning the latches in opposing relationship, the accessory tool 38 is releasable by moving the two latch actuators toward each other and toward the wand 38, for example by a user squeezing the two latch actuators toward each other using one hand.

The motor 24 may be provided with a cooling airflow. In one alternative, the handle 14 forms a duct through which the motor cooling airflow exhausts from the main body 12. As shown in FIG. 2, the motor cooling air may further be directed past the battery 30 before exhausting from the main body 12.

Figure 9:
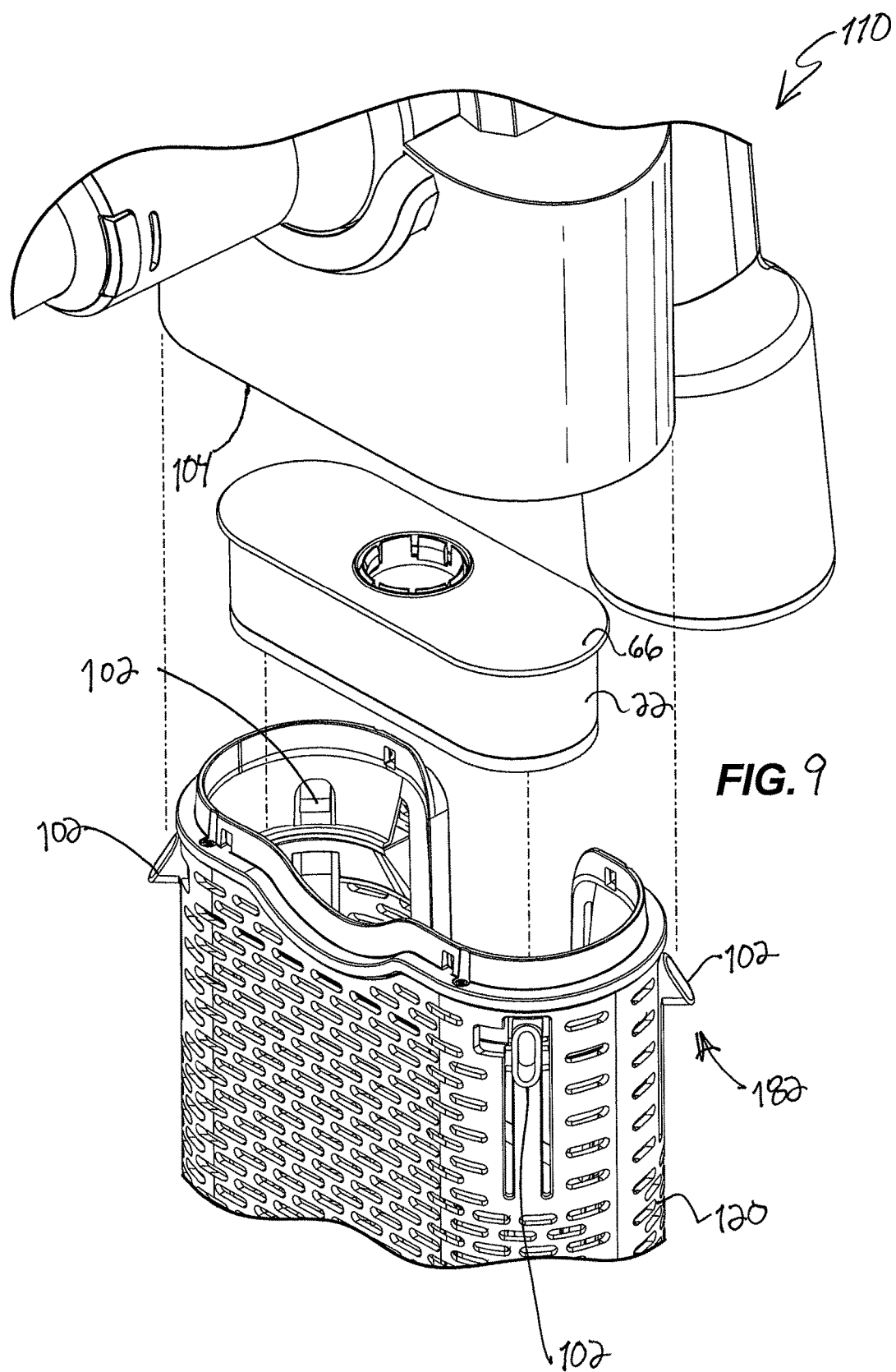
FIG. 9 is a partially exploded view of a handheld vacuum cleaner according to another embodiment.
Figure 10:
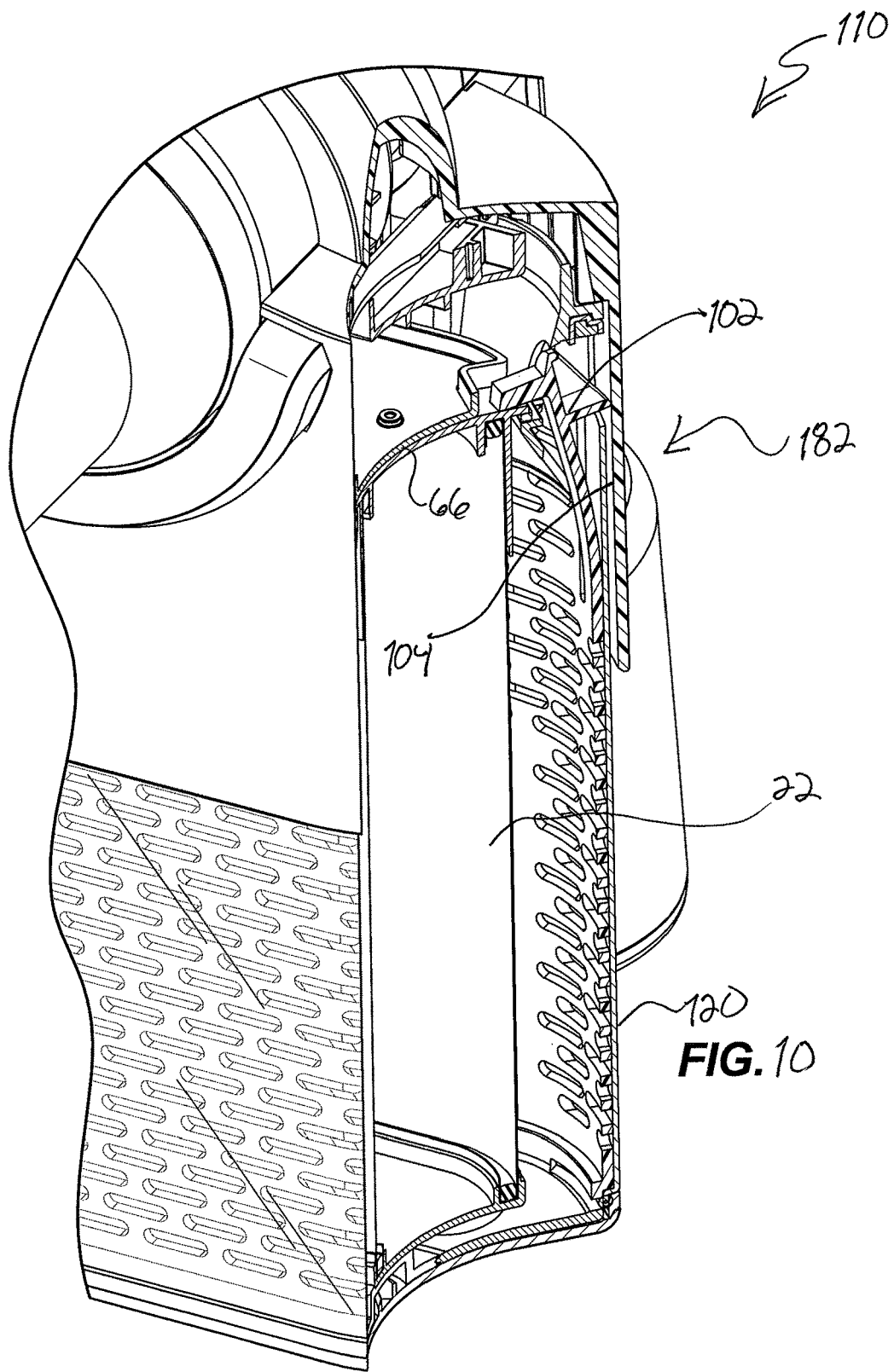
FIG. 10 is a partial cross-sectional view of the handheld vacuum cleaner of FIG. 9.

FIGS. 9 and 10 illustrated a handheld vacuum cleaner 110 according to another embodiment. The vacuum cleaner 110 includes features similar to the vacuum cleaner 10 described above and only some differences between the vacuums 10 and 110 will be discussed. Generally, the vacuum cleaner 110 does not include the same filter release mechanism 82 illustrated in the vacuum cleaner 10 described above. Rather the vacuum cleaner 110 includes a filter release mechanism 182 that includes tabs 102 that are part of the outer housing 120. When the user installs the filter 22, the tabs 102 press against an inner wall 104 of the vacuum 110, which causes the tabs 102 to deflect inward and over the upper housing 66 of the filter 22 as shown in FIG. 10. Then, when the user changes the filter 22 and removes the housing 120 by pulling down on the housing 120, the filter 22 is removed with the housing 120. The tabs 102 contact the upper housing 66 of the filter 22 to pull the filter 22 with the housing 120. When the housing 120 is removed from the vacuum cleaner 110, the tabs 102 automatically move back out to the position in FIG. 9 so that the user can empty the filter 22 from the housing 120 without touching the filter 22.

The remaining figures and description illustrate and describe alternative embodiments of the filter 22 that can be used with the vacuum cleaners described above and method of manufacturing the filters.

Figure 11:
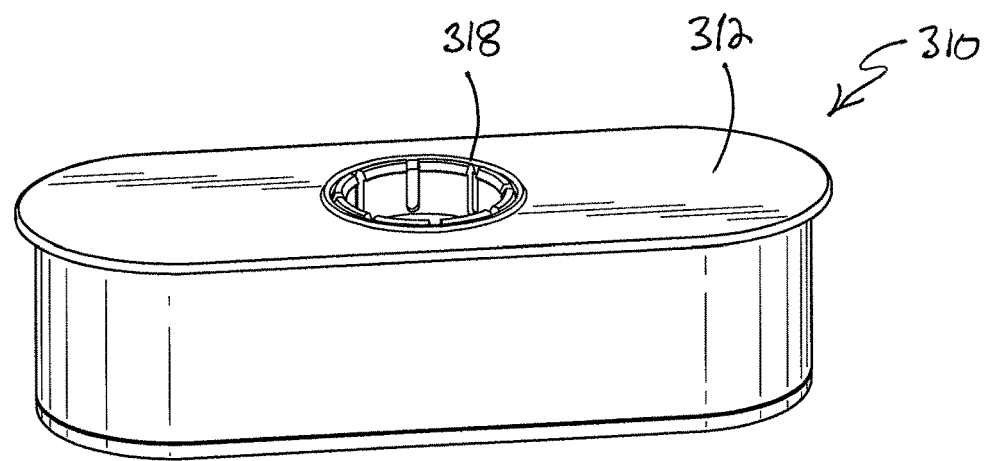
FIG. 11 is a perspective view of a filter in a collapsed position according to an embodiment.
Figure 12:
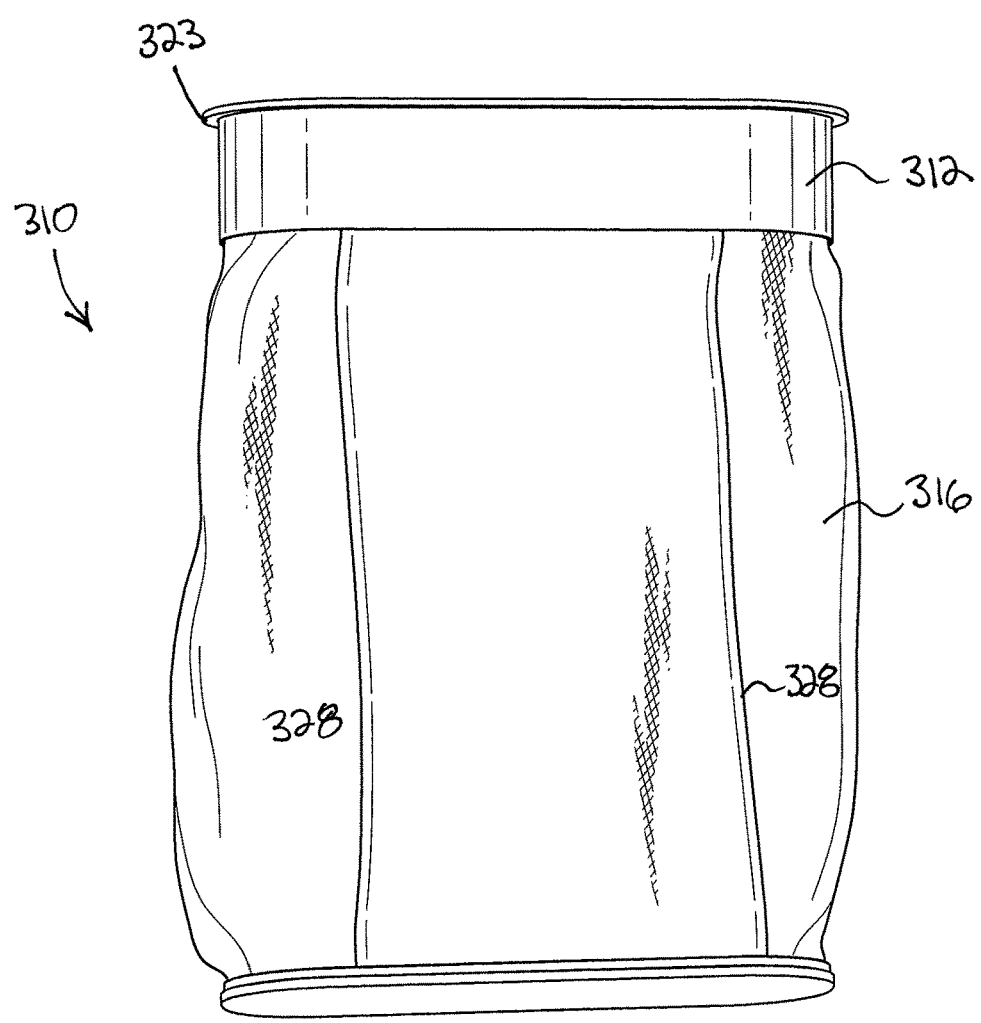
FIG. 12 is a perspective view of the filter of FIG. 11 in an expanded position.

FIGS. 11 and 12 illustrate a filter 310. The filter 310 can move between a collapsed position (FIG. 11) and an expanded position (FIG. 12). The filter 310 may be supplied to the consumer in the collapsed position. Then, in one embodiment, the filter 310 is installed in a device in the collapsed position and then automatically moves to the expanded position. The filter 310 can automatically move to the expanded position by air pressure, gravity, mechanical push or pull, etc. In an alternative embodiment, the consumer moves the filter to the expanded position prior to installing the filter into a device. The filter 310 can be used to filter any suitable fluid in several applications. For example, the filter 310 can be used in vacuum cleaners, air purifiers, HVAC systems, automotive applications, etc.

With reference to FIGS. 11 and 12, the filter 310 includes a first or upper housing 312, a second or lower housing 314, and filter media 316. The upper housing 312 includes an inlet opening 318 that provides fluid communication into the filter 310. In some embodiments, a valve 319 is located within the inlet opening 318 to open and close the inlet opening 318. For example, when the filter 310 is ready to be removed from the device (e.g., vacuum), the valve 319 is closed so that debris within the filter 310 does not escape through the inlet opening 318. The upper housing 312 has an inner volume 320 (see FIG. 15A) within the housing 312. Likewise, the lower housing 314 includes an inner volume 321. The inner volumes 320, 321 of the upper housing 312 and the lower housing 314 can be equal or one of the volumes can be greater than the other. In various alternatives, the inner volumes of one or both of the upper housing and the lower housing are small or inappreciable due to the shape of the housing. The upper housing 312 and the lower housing 314 can be formed from any suitable material, such as thermoplastic material, thermoset material, molded paper pulp, formed or molded filter media, or any other suitable material. Alternatively or additionally, the upper housing 312 forms a support collar 323 for installing the filter 310 in a vacuum cleaner.

Figure 13:
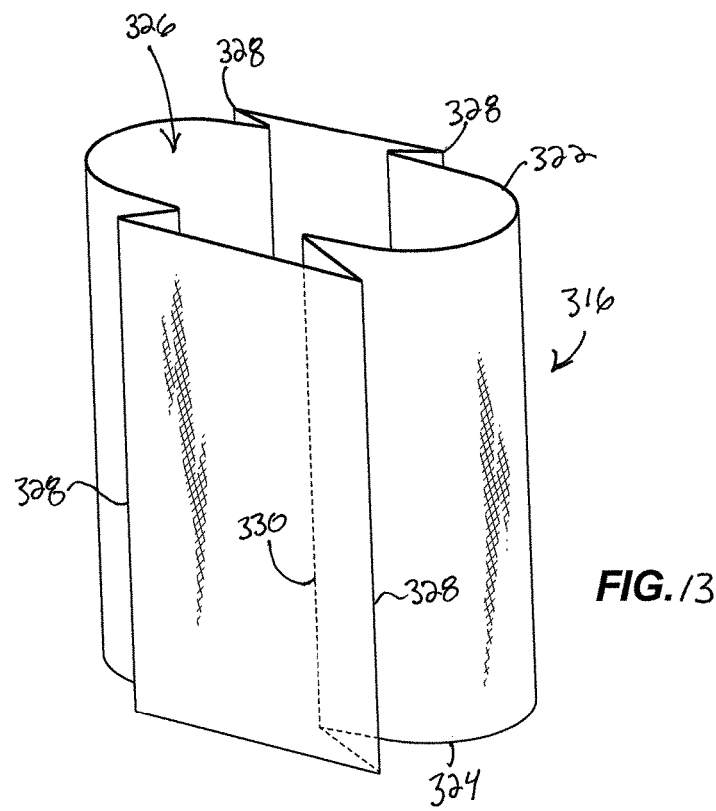
FIG. 13 is a perspective view of the filter of FIG. 12, illustrating filter media of the filter without an upper and lower housing.

With reference to FIG. 13, the filter media 316 includes a first end 322 and a second end 324. The filter media 316 is coupled to the upper housing 312 proximate the first end 322 while, the filter media 316 is coupled to the lower housing 314 proximate the second end 324. An inner volume 326 of the filter media 316 is defined between the first end 322 and the second end 324 of the filter media 316. Optionally, the filter media 316 includes one or more pleats 328 extending between the first end 322 and the second end 324. The pleats 328 enable the filter 310 to enlarge beyond the expanded position in a direction transverse to the direction traveled between the collapsed and expanded positions. In other words, the pleats 328 allow the filter 310 to billow outward in order to collect and store additional debris as the filter 310 fills. The illustrated filter media 316 typically includes a seam 330. Generally, the filter media 316 is a flat piece that is made tubular by joining two ends together, thereby creating the seam 330. As shown, the seam 330 is located within one of the pleats 328 to substantially hide the seam 330. The seam 330 can be formed by sewing, heat welding, crimping, or other suitable means of coupling the two ends together.

With reference to FIGS. 11 and 12, the filter 310 can move between a collapsed position (FIG. 11) and an expanded position (FIG. 12). In the collapsed position, the filter media 316 is located within the inner volume 320 of the upper housing 312 and/or in the inner volume of the lower housing 314. Also, the upper housing 312 and the lower housing 314 enclose the filter media 316 in the collapsed position. In some embodiments, the upper housing 312 and/or lower housing 314 can snap or otherwise connect together to retain the filter 310 in the collapsed position by interlocking features provided in the upper and lower housings. Alternatively, the filter 310 may be held in the collapsed position by tape, film, bag, or other attachments. Typically, the filter 310 would be supplied to the user in the collapsed position. In the expanded position, the filter media 316 generally expands out to an operative length and is ready for use as a filter. In some applications, the filter 310 automatically moves from the collapsed position to the expanded position. For example, when a flow of dirty fluid enters the filter 310 through the inlet opening 318, the pressure of the fluid automatically expands the filter 310. In other applications, gravity may automatically expand the filter 310, or a mechanism may be used to push or pull one or both housings away from the other.

The inner volume 326 of the filter media, along with the inner volume 320 of the upper housing 312, and the inner volume 321 of the lower housing 314 together define a collection container 332 that stores debris separated by the filter media 316. That is, a dirty fluid (e.g., air and dust, dirt, or other particles) travels into the filter 310 through the inlet opening 318. The dirt or dust is separated from the air flow by the filter media 316 and relatively clean air flows out of the filter 310 through the filter media 316 between the housings 312, 314. This airflow is generally represented by the arrows 334.

The filter 310 further includes a first attachment member 336 that couples the filter media 316 to the upper housing 312. In the illustrated embodiments, the filter media is folded over the first attachment member 336 between the first end 322 and the second end 324 of the filter media 316, but generally closer to the first end 322, before it is connected to the upper housing 312. Stated another way, all or a portion of the first end 322 of the filter media 316 is folded over before being coupled to the upper housing 312. Similarly, the filter 310 includes a second attachment member 338 that couples the filter media 316 to the lower housing 314 between the first end 322 and the second end 324 of the filter media 316, but closer to the second end 324. The first attachment member 336 is received within a groove 340 of the upper housing 312 holding the filter media in place, whereas the second attachment member 338 is received within a groove 342 of the lower housing 314. The grooves 340, 342 are formed with an inner wall 341 and an outer wall 343 (FIG. 15B). As shown in FIG. 15A, the height H1 of the outer wall 343 is greater than the height H2 of the inner wall 341. In an alternative embodiment, the height H1 of the outer wall 343 is the same as the height H2 of the inner wall 341.

To couple the filter media 316 to the upper housing 312 in the illustrated embodiment, all or a portion of the end of the filter media 316 is folded over the first attachment member 336 and fitted into the groove 340 of the upper housing 312. As such, the filter media 316 is disposed between the groove 340 and the first attachment member 336. The fit between the groove 340 and the attachment member 336 with filter media 316 is a friction or limited clearance fit to wedge the filter media 316 and attachment member 336 into the groove 340 to couple the filter media 316 to the upper housing 312. Alternatively, the attachment member 336 is staked, welded, snap fit, adhered, or otherwise fastened to the upper housing 312 to couple the filter media 316 to the upper housing 312. In one alternative, at least a portion of the edge 322 of the first end 322 of the filter media 316 is retained in the groove 340 by fitting the attachment member 336 into the groove 340. The connection of the filter media 316 to the upper housing 312 is provided around the upper housing 312 inhibiting airflow through the connection.

To couple the filter media 316 to the lower housing 314, the filter media 316 is wrapped around the second attachment member 338 and fitted into the groove 342 of the lower housing 314 in a similar way as described for the filter media 316 coupling to the upper housing 312. As such, the filter media 316 is retained in the groove 342 by fitting the second attachment member 338 into the groove 342. The connection of the filter media 316 to the lower housing 314 is provided around the lower housing 314 inhibiting airflow through the connection. In various alternatives, the connection of the filter media 316 to the lower housing 314 may use a different method than the connection to the upper housing 312. In one alternative, the filter media 316 does not use a lower housing 314, instead closing the second end 324 with a seam or other closure.

Figure 14:
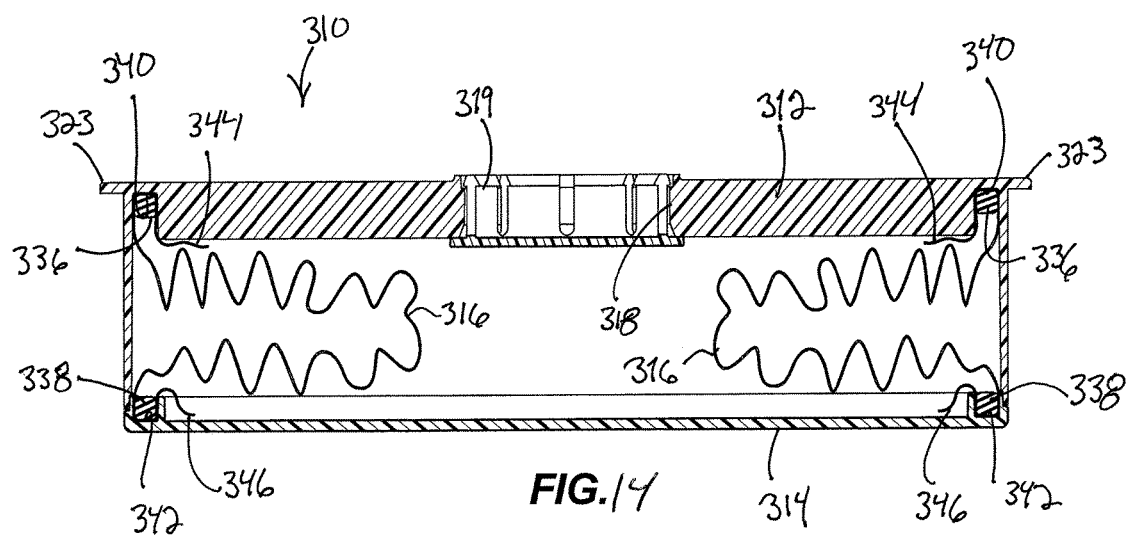
FIG. 14 is a cross-sectional view of the filter in the collapsed position.
Figure 15:
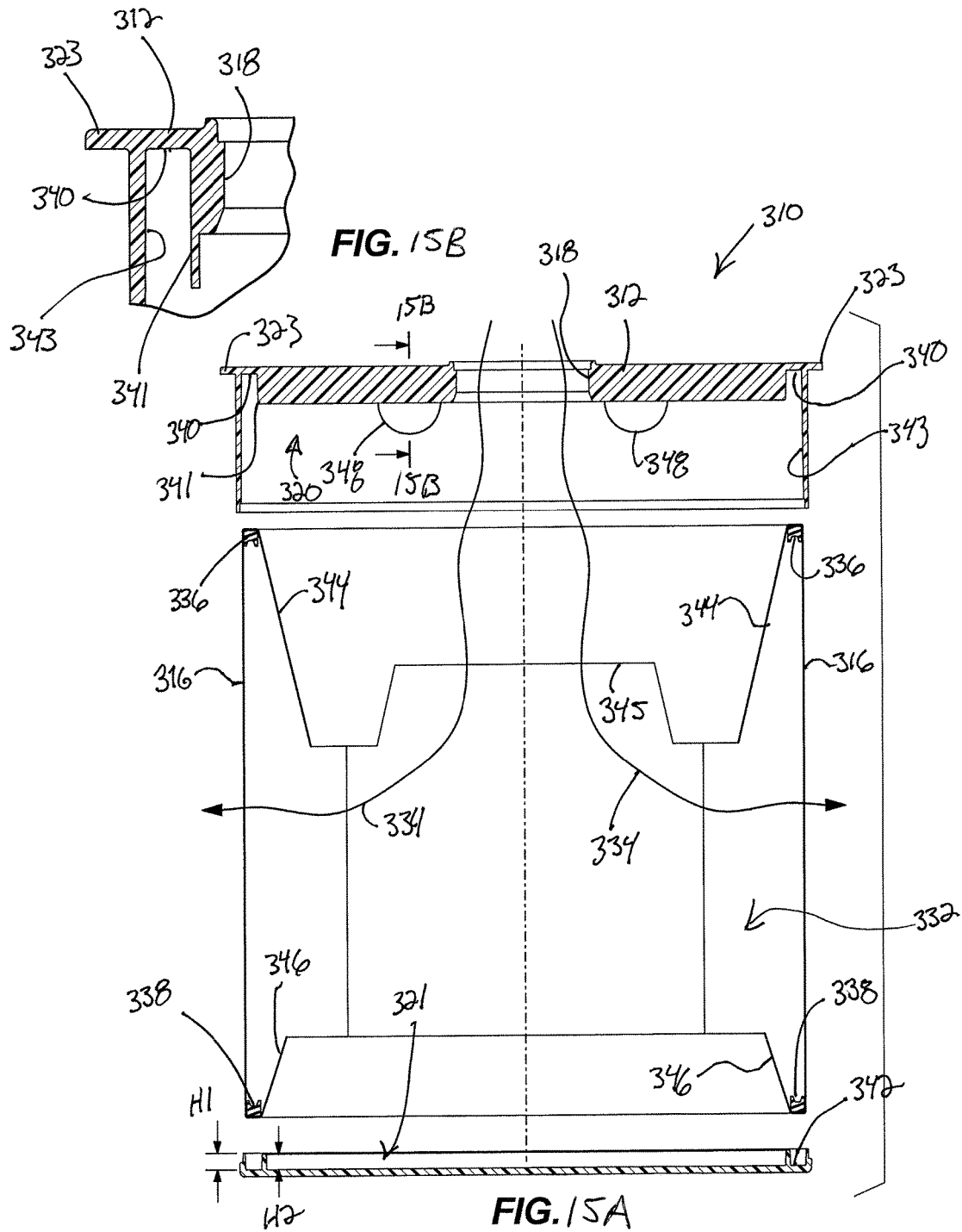
FIG. 15A is an exploded cross-sectional view of the filter in the expanded position.
FIG. 15B is a cross-sectional view of the filter along line 15B-15B of FIG. 15A.
Figure 16:
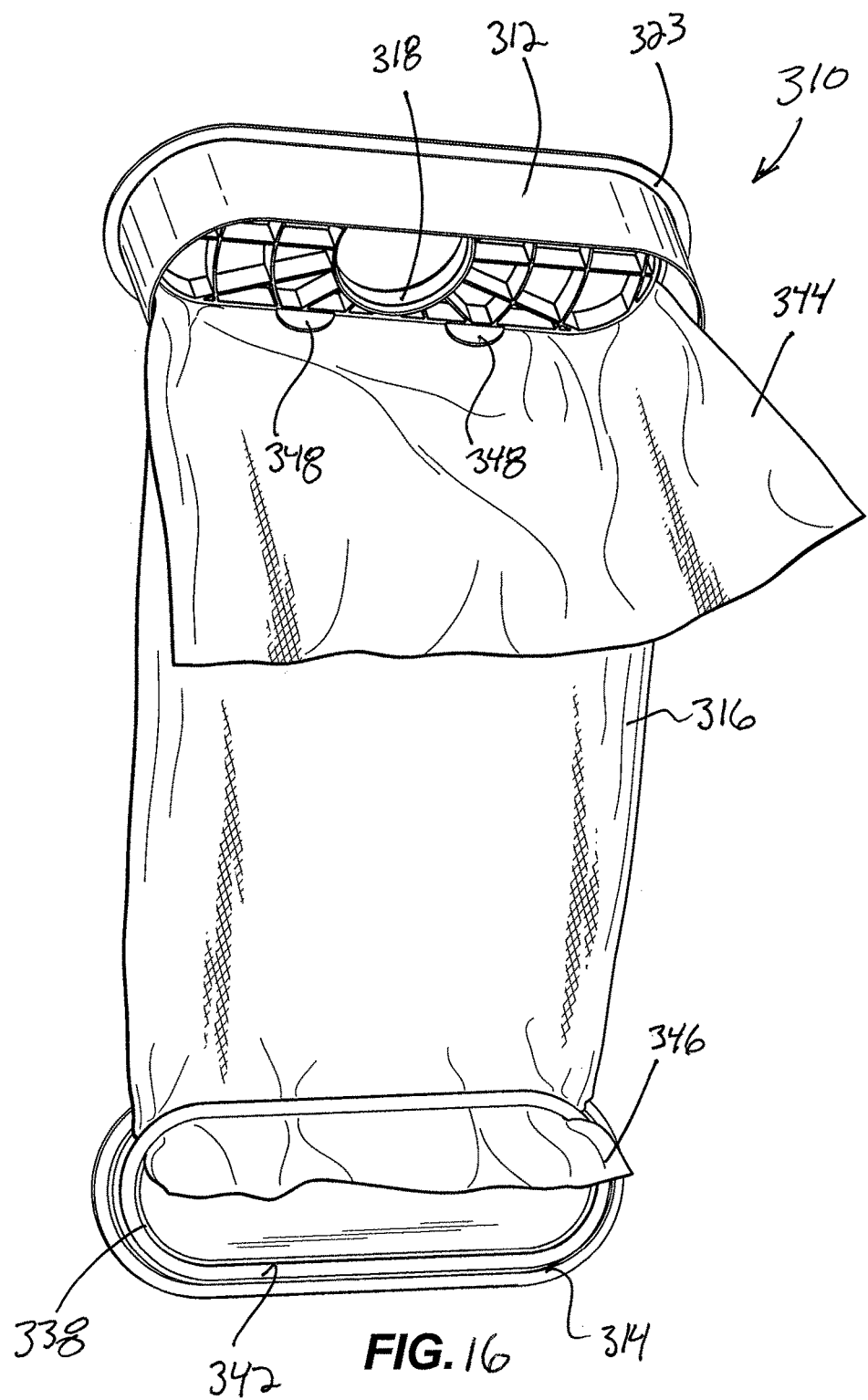
FIG. 16 is a perspective view of an interior of the filter with a portion of the filter media cutaway.

With continued reference to FIGS. 14-16, the filter 310 may include a first overlapping filter media section 344 and a second overlapping filter media section 346. The first overlapping filter media section 344 is proximate the upper housing 312 and is a result of the first end 322 of the filter media 316 being folded such that at least a portion of the first end 322 extends away from the housing 312 forming the overlapping filter media section 344. In the illustrated embodiment, the first end 322 of the filter media 316 is folded over the attachment member 336 in a manner that the first end 322 extends away from the upper housing 312 a desired length. As such, the filter media 316 overlaps to provide two layers at the first overlapping filter media section 344. The first overlapping filter media section 344 may extend around the perimeter of the filter 310 or may extend along one or more portions of the perimeter of the filter 310. In certain embodiments, all or desired portions of the overlapping filter media 344 may be trimmed, or filter media 316 positioned such that a desired amount of filter media 316 extends beyond the attachment member 336 in predetermined locations. In the embodiment shown in FIG. 15A, the first overlapping filter media section 344 includes a notch 345 in a portion. The notch 345 inhibits the conduit 60 from catching on the filter media section 344 when the conduit 60 moves into and out of the filter. The second overlapping filter media section 46 is proximate the lower housing 314 and is a results of the second attachment member 338 bending the filter media 316 in a manner that the second end 324 extends away from the lower housing 314. As such, the filter media 316 overlaps to provide two layers and forms the second overlapping filter media section 346. The second overlapping filter media section 346 may extend around the perimeter of the filter 310 or may extend along one or more portions of the perimeter of the filter 310. In certain embodiments, all or desired portions of the overlapping filter media 46 may be trimmed, or filter media 316 positioned such that a desired amount of filter media 316 extends beyond the second attachment member 338 in predetermined locations. In the illustrated embodiment, both of the first and second overlapping filter media sections 344, 346 are disposed in the inner volume 326 of the filter media 316. However, for certain embodiments the filter 310 may be constructed with the overlapping filter media portions 344, 346 being positioned to the outside of the filter 310.

As shown in FIGS. 15A and 16, the upper housing 312 may include one or more extension members 348 adjacent the groove 340. The extensions members 348 are positioned in a location to direct the overlapping filter media section 344 to extend in a direction along the outer wall 343 of the upper housing 312 and filter media 316. The extension members 348 may be integrally formed with the upper housing 312 or may be formed separately and installed in the filter 310.

As previously mentioned, the first overlapping filter media section 344 is proximate the upper housing 314. The length and width and location of the first overlapping filter media section 344 or the second overlapping filter media section 346 may be provided where it is in a direct path of some or all of the airflow (see arrow 334 of FIG. 17A) exiting the device (e.g., a discharge conduit of a vacuum) to receive impact of impinging debris as the debris enters the filter 310.

One or both of the attachment members 336, 338 may include a recess, protrusion, or other shape 350 configured for nesting or attaching to a fixture provided to guide the attachment member 336, 338 into the groove 340, 342. As shown in FIGS. 17B and 17C, the attachment member 336, 338 may include the fixturing recess, protrusion, or other shape 350 on the side facing out of the groove 340, 342.

Figure 18A:
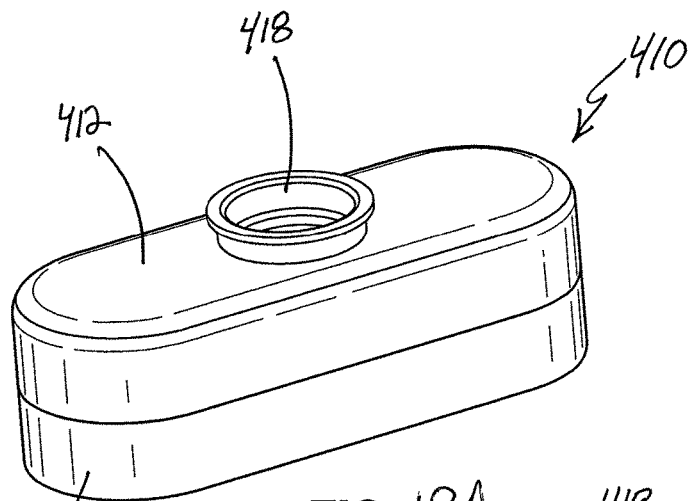
FIG. 18A is a perspective view of a filter in a collapsed position according to another embodiment.
Figure 18B:
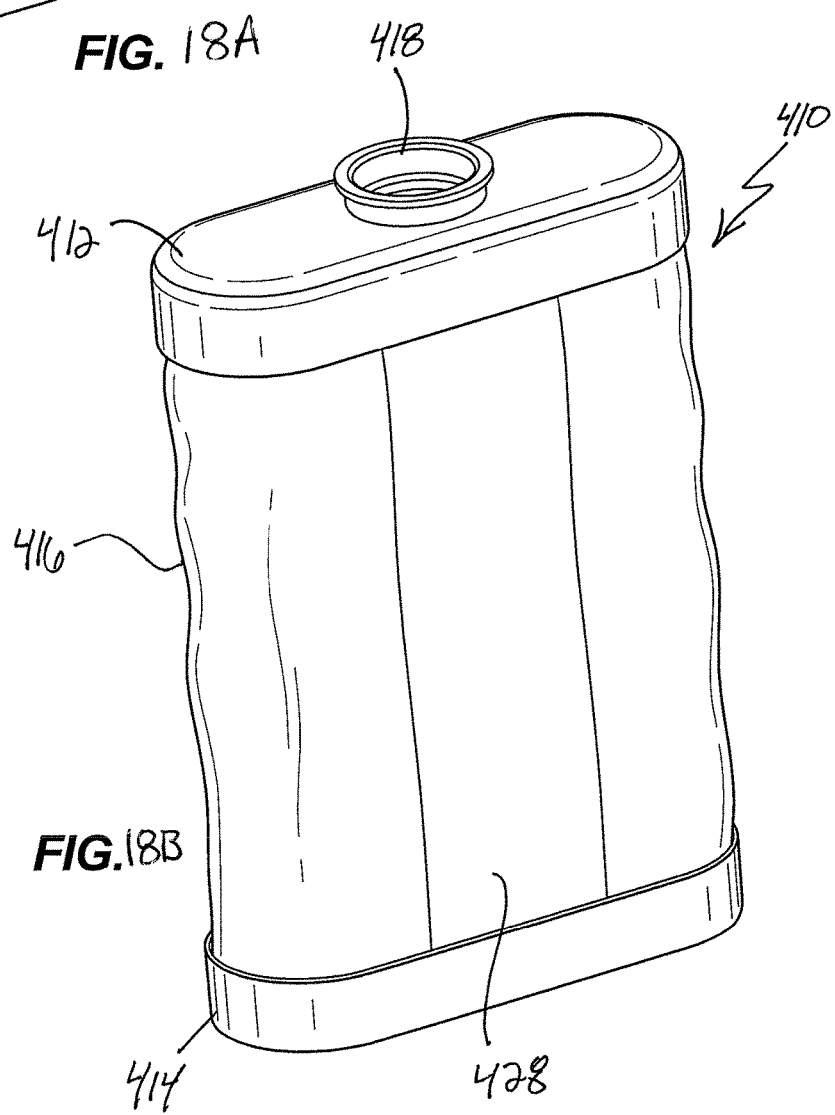
FIG. 18B is a perspective view of the filter of FIG. 18A in an expanded position.

FIGS. 18A and 18B illustrate a filter 410. The filter 410 can move between a collapsed position (FIG. 18A) and an expanded position (FIG. 18B). The filter 410 may be supplied to the consumer in the collapsed position. Then, in one embodiment, the filter 410 is installed in a device in the collapsed position and then automatically moves to the expanded position. The filter 410 can automatically move to the expanded position by air pressure, gravity, mechanical push or pull, etc. In an alternative embodiment, the consumer moves the filter to the expanded position prior to installing the filter into a device. The filter 410 can be used to filter any suitable fluid in several applications. For example, the filter 410 can be used in vacuum cleaners, air purifiers, HVAC systems, automotive applications, etc.

Referring to FIGS. 18A and 18B, the filter 410 includes a first or upper housing 412, a second or lower housing 414, and filter media 416. The upper housing 412 includes an inlet opening 418 that provides fluid communication into the filter 410. In some embodiments, a valve is located within the inlet opening 418 to open and close the inlet opening 418. For example, when the filter 410 is ready to be removed from the device (e.g., vacuum), the valve is closed so that debris within the filter 410 does not escape through the inlet opening 418. The upper housing 412 has an inner volume 420 (see FIG. 27A) within the housing 412. Likewise, the lower housing 414 includes an inner volume. The inner volumes of the upper housing 412 and the lower housing 414 can be equal or one of the volumes can be greater than the other. The upper housing 412 and the lower housing 414 can be formed from any suitable material, such as thermoplastic material, thermoset material, molded paper pulp, formed or molded filter media, or any other suitable material.

Figure 27A:
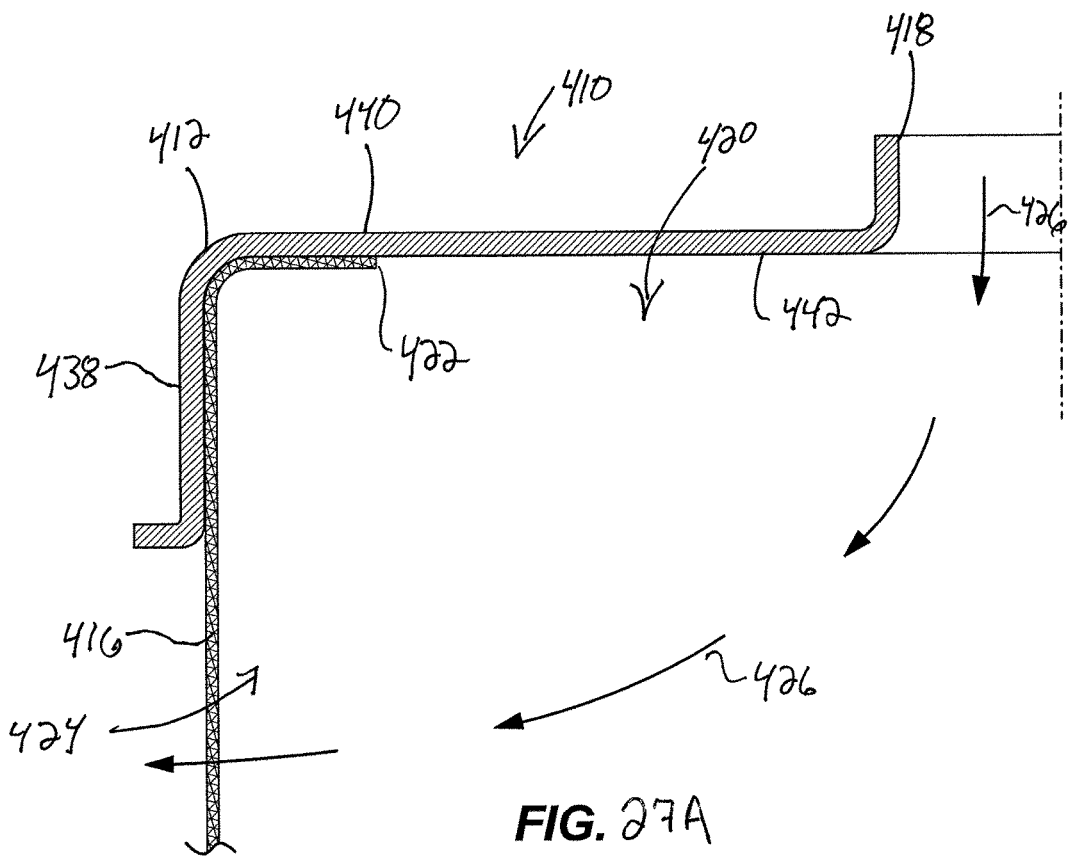
FIG. 27A is a cross-sectional view of a filter according to another embodiment.

The filter media 416 includes a first end 422 (see FIG. 27A). The filter media 416 is coupled to the upper housing 412 at the first end 422. Likewise, the filter media 416 has a second end and the filter media 416 is coupled to the lower housing 414 at the second end. As will be discussed in more detail below, the first and second ends of the filter media 416 can be attached to the housings 412, 414 using a variety of methods. An inner volume 424 (see FIG. 27A) of the filter media 416 is defined between the first end 422 and the second end (not shown in FIG. 27A) of the filter media 416.

The inner volume 424 of the filter media, along with the inner volume 420 of the upper housing 412, and the inner volume of the lower housing 414 together define a collection container 425 that stores debris separated by the filter media 416. That is, a dirty fluid (e.g., air and dust, dirt, or other particles) travels into the filter 410 through the inlet opening 418. The dirt or dust is separated from the air flow by the filter media 416 and relatively clean air flows out of the filter 410 through the filter media 416 between the housings 412, 414. This airflow is generally represented by the arrows 426 in FIG. 27A.

Referring to FIG. 18B, in one embodiment, a panel 428 is located at a seam of the filter media 416, for example along a vertical seam. In one alternative, the panel 428 is clear to allow a user to see how much debris is in the filter 410 to indicate to the user when the collection container 425 is full. In addition or in other embodiments, the panel 428 can be decorative and/or can include odor absorbing material.

Figure 18C:
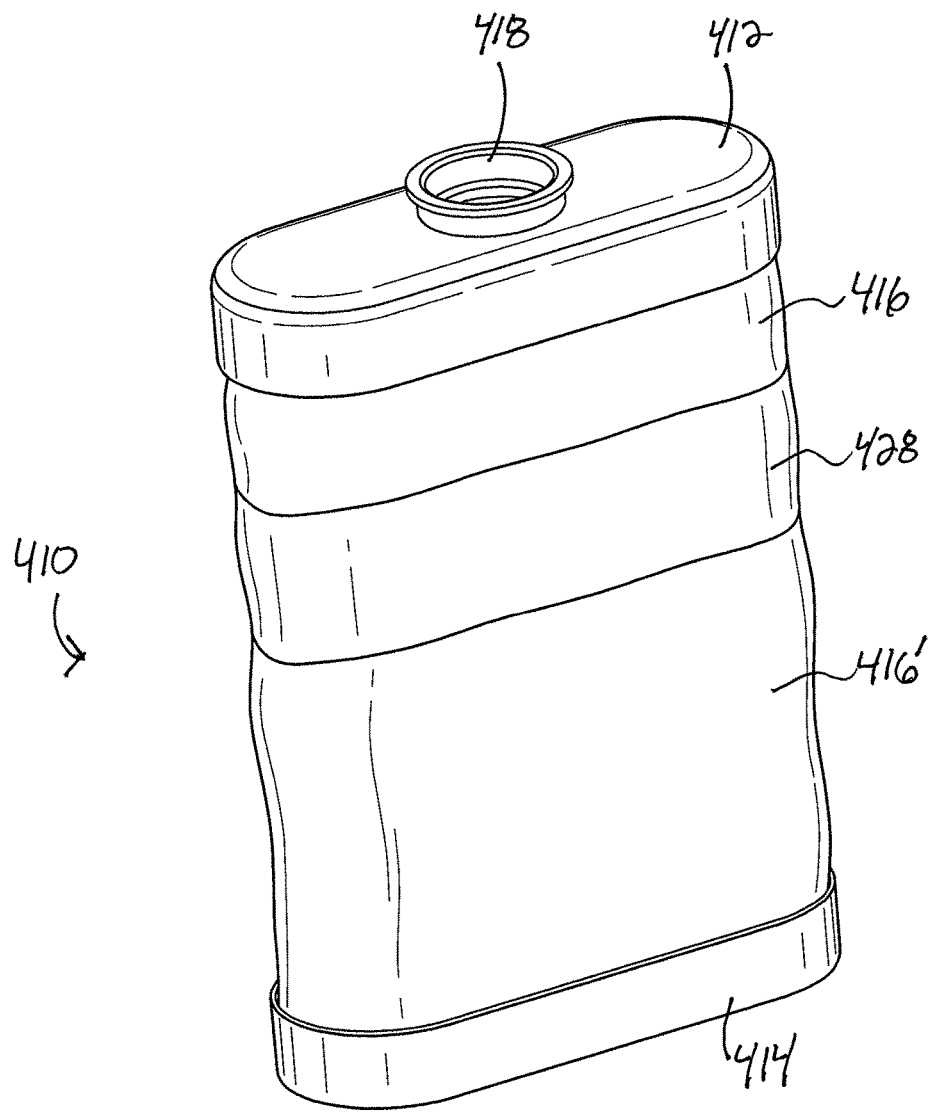
FIG. 18C is a perspective view of an alternative embodiment of the filter of FIG. 18A in an expanded position.

Referring to FIG. 18C, in an alternative embodiment, the filter may be constructed such that the optional panel 428 may be provided along a horizontal seam. In this construction, the filter media 416 is divided into two sections, and the filter media 416 is attached to the housing 412. The second piece of filter media 416' is attached to the filter media 416, optionally with the panel 428 provided along the horizontal seam between the filter media sections 416, 416'.

Referring to FIGS. 18A and 18B, the filter 410 can move between a collapsed position (FIG. 18A) and an expanded position (FIG. 18B). In the collapsed position, the filter media 416 is located within the inner volume 420 (the inner volume being shown in one embodiment in FIG. 27A) of the upper housing 412 and/or in the inner volume of the lower housing 414. Also, the upper housing 412 and the lower housing 414 enclose the filter media 416 in the collapsed position. In some embodiments, the upper housing 412 and/or lower housing 414 can snap or otherwise connect together to retain the filter 410 in the collapsed position by interlocking features provided in the upper and lower housings. Alternatively, the filter 410 may be held in the collapsed position by tape, film, bag, or other attachments. Typically, the filter 410 would be supplied to the user in the collapsed position. In the expanded position, the filter media 416 generally expands out to an operative length and is ready for use as a filter. In some applications, the filter 410 automatically moves from the collapsed position to the expanded position. For example, referring to FIG. 27A, when a flow of dirty fluid (represented by arrows 426) enters the filter 410 through the inlet opening 418, the pressure of the fluid automatically expands the filter 410. In other applications, gravity may automatically expand the filter 410, or a mechanism may be used to push or pull one or both housings away from the other.

Figure 19A:
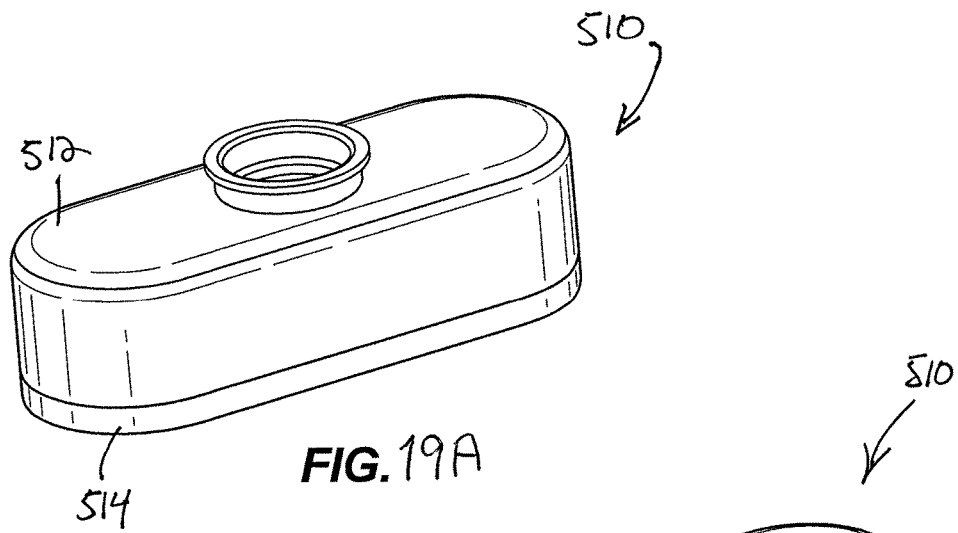
FIG. 19A is a perspective view of a filter in a collapsed position according to another embodiment.
Figure 19B:
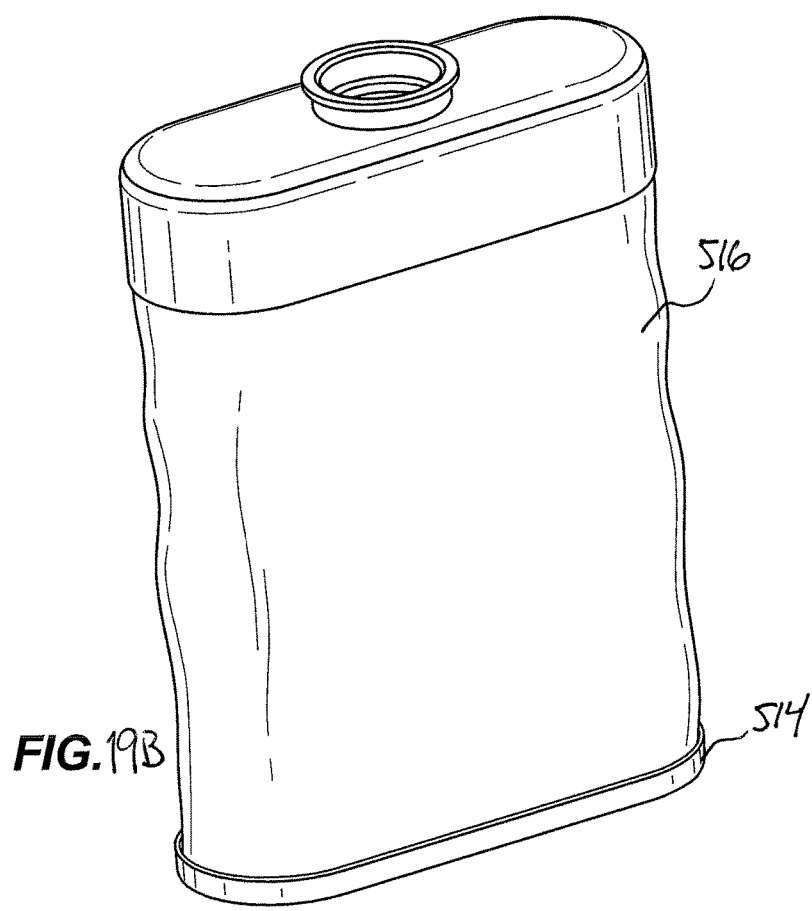
FIG. 19B is a perspective view of the filter of FIG. 19A in an expanded position.

FIGS. 19A and 19B illustrate a filter 510 according to another embodiment. The filter 510 includes features similar to the filter 410 of FIGS. 18A and 18B and only some differences between the filters 410, 510 will be discussed. The filter 510 includes a lower housing 514 that is generally flat and has very little, if any, inner volume. In the illustrated embodiment, in the collapsed position, the filter media 516 is virtually entirely received in the inner volume of the upper housing 512. In this embodiment, the lower housing 514 functions as a cap to close the upper housing 512 and retain the filter media 516 in the collapsed position. Alternatively, at least a portion of the filter media 516 is received in the inner volume of the upper housing 512.

Figure 20A:
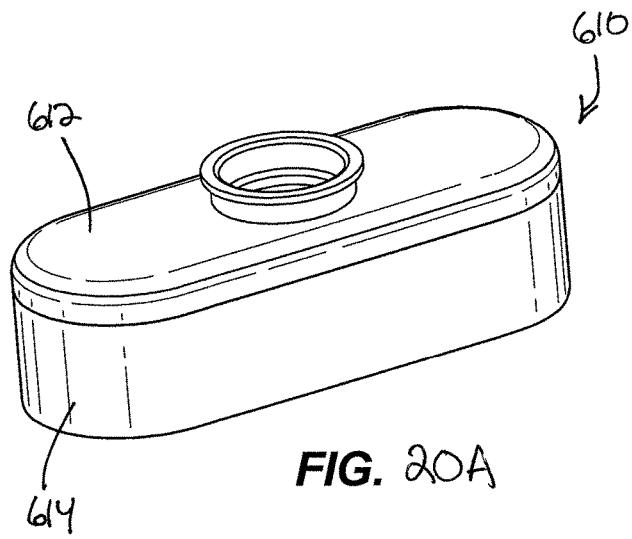
FIG. 20A is a perspective view of a filter in a collapsed position according to another embodiment.
Figure 20B:
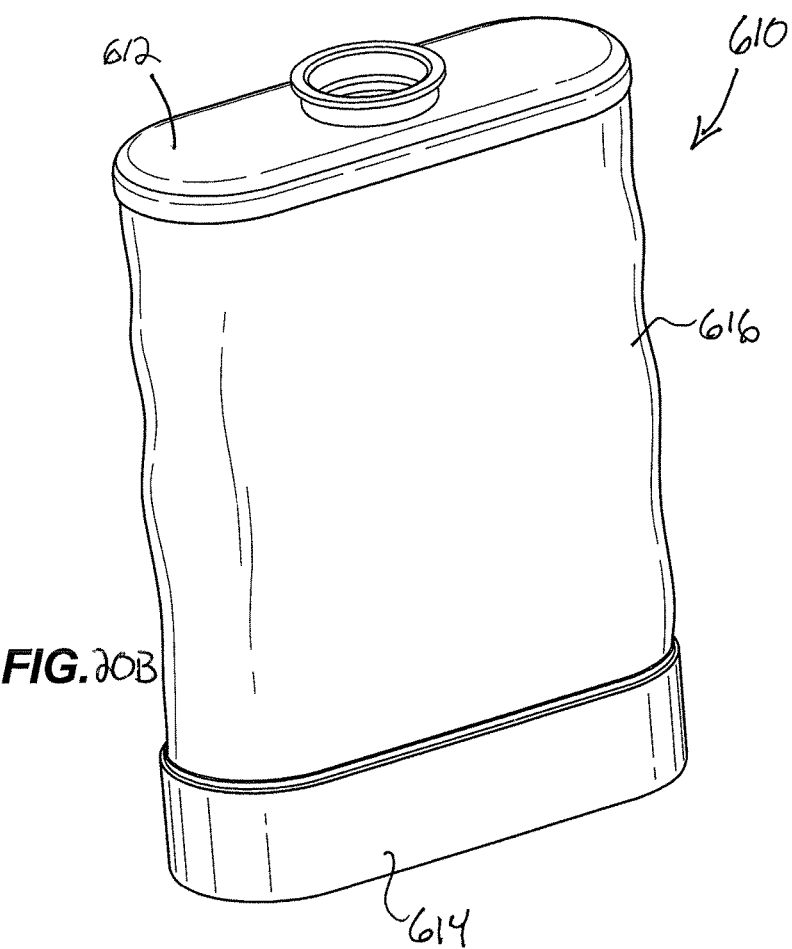
FIG. 20B is a perspective view of the filter of FIG. 20A in an expanded position.

FIGS. 20A and 20B illustrate a filter 610 according to another embodiment. The filter 610 includes features similar to the filters discussed above and only some differences between the filters will be discussed. The filter 610 includes an upper housing 612 that is generally flat and has very little, if any, inner volume. In the illustrated embodiment, in the collapsed position, the filter media 616 is virtually entirely received in the inner volume of the lower housing 614. In this embodiment, the upper housing 612 functions as a cap to close the lower housing 614 and retain the filter media 616 in the collapsed position. Alternatively, at least a portion of the filter media 616 is received in the inner volume of the lower housing 614.

Figure 21A:
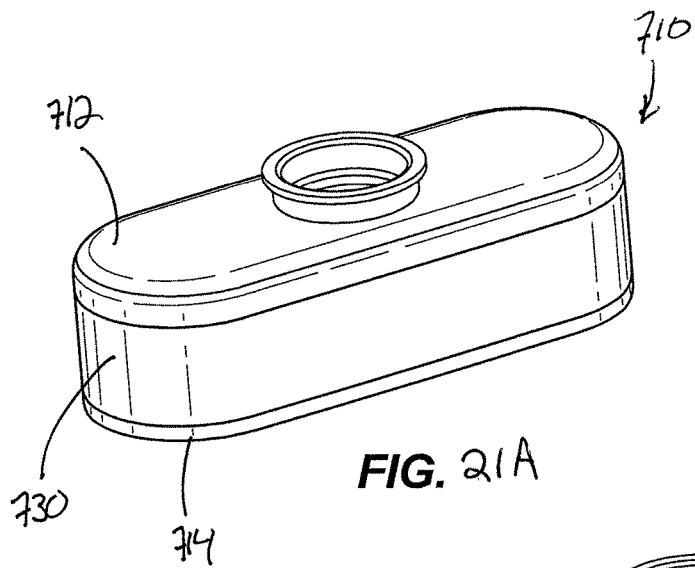
FIG. 21A is a perspective view of a filter in a collapsed position according to another embodiment.
Figure 21B:
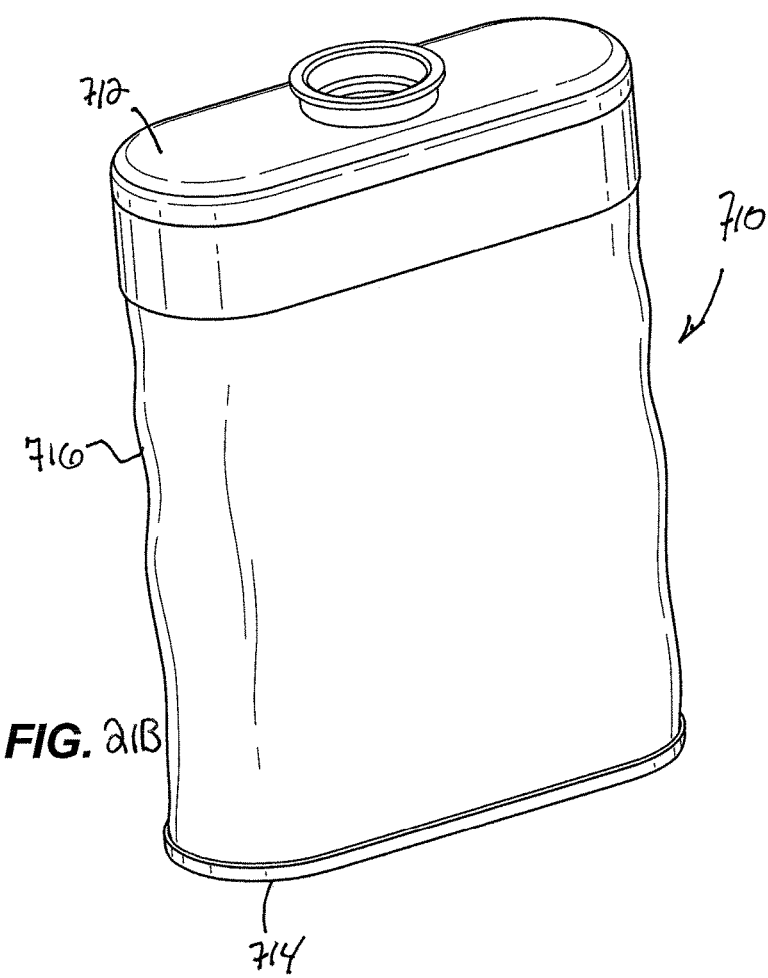
FIG. 21B is a perspective view of the filter of FIG. 20A in an expanded position.
Figure 22A:
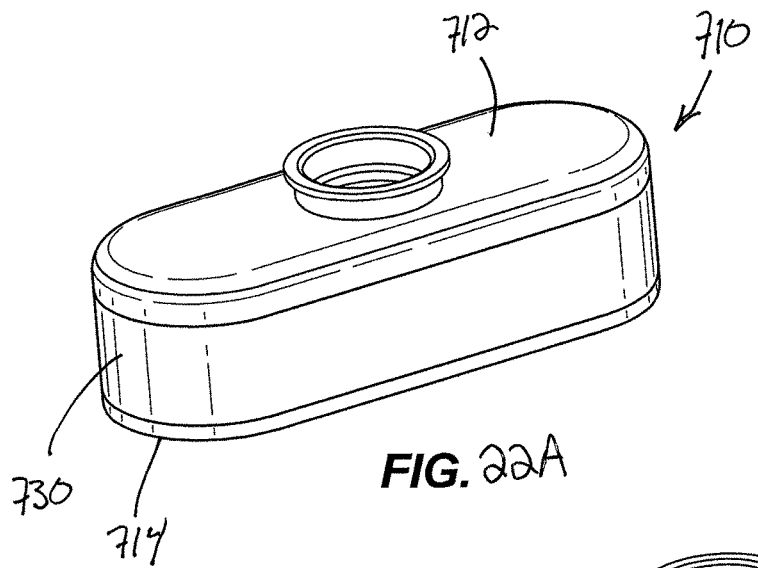
FIG. 22A is a perspective view of a filter in a collapsed position according to another embodiment.
Figure 22B:
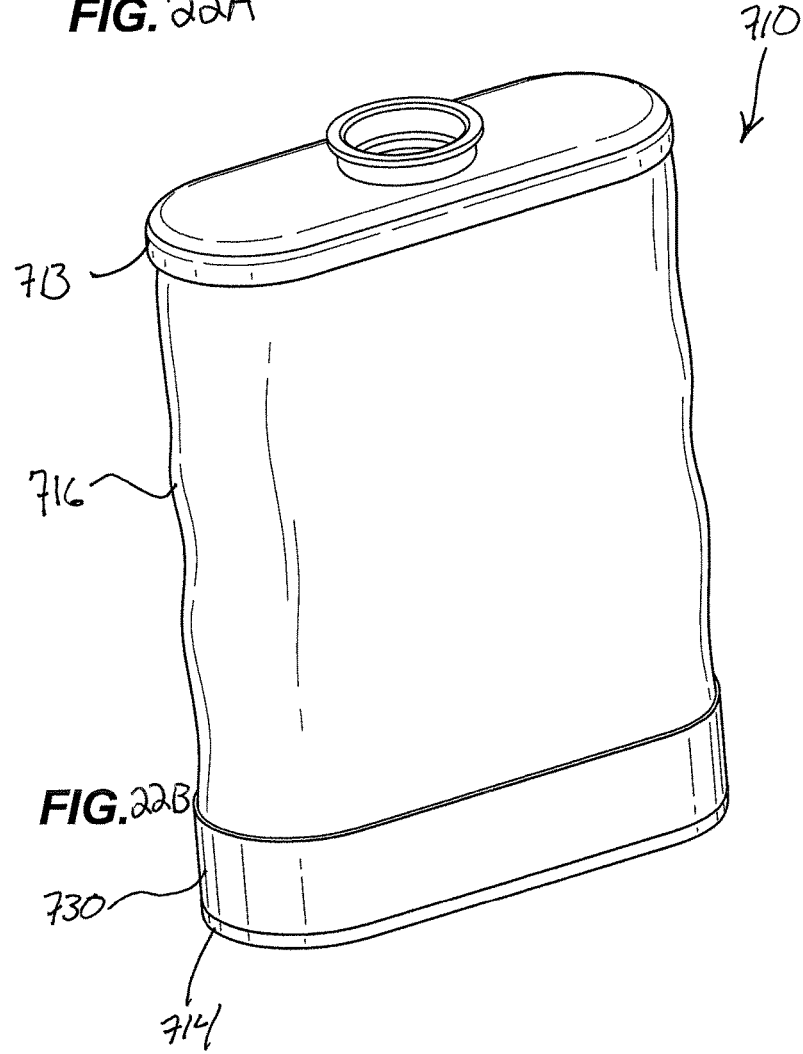
FIG. 22B is a perspective view of the filter of FIG. 22A in an expanded position.

FIGS. 21A, 21B, 22A and 22B illustrate a filter 710 according to another embodiment. The filter 710 includes features similar to the filters discussed above and only some differences between the filters will be discussed. The filter 710 includes an upper housing 712 and a lower housing 714 and either or both of the upper and lower housings may be generally flat or may have an inner volume. The filter 710 further includes an intermediate portion 730. In the illustrated embodiment, in the collapsed position, the filter media 716 is received between the housings 712, 714 and surrounded and enclosed by the intermediate portion 730. In some embodiments, the intermediate portion 730 is a tear-away style component that remains attached to either the upper housing 712 or the lower housing 714. For example, there is a perforation or similar attachment between the intermediate portion 730 and the upper housing 712 and/or lower housing 714. The perforation is torn or broken to allow the filter 710 to move to the expanded position (FIG. 21B). FIG. 21B illustrates the intermediate portion 730 remaining attached to the upper housing 712 in the expanded position. FIG. 22B illustrates the intermediate portion 730 remaining attached to the lower housing 714 in the expanded position. In yet another alternative, the intermediate portion is connected to the upper housing and/or lower housing with engaging features such as snap-fits, friction-fits, protrusions, tabs, hooks, interlocks, or other features that engage corresponding features such as recesses, openings, snap-fits, friction-fits, tabs, protrusions, hooks, interlocks, or other features to connect the intermediate portion with the adjacent housing. Engaging features between the intermediate portion and adjacent housings may be configured so that the connection to one of the adjacent housings is stronger than the connection to the other housing to control whether the intermediate portion remains with the upper housing or the lower housing when moving to the expanded position.

Figure 23A:
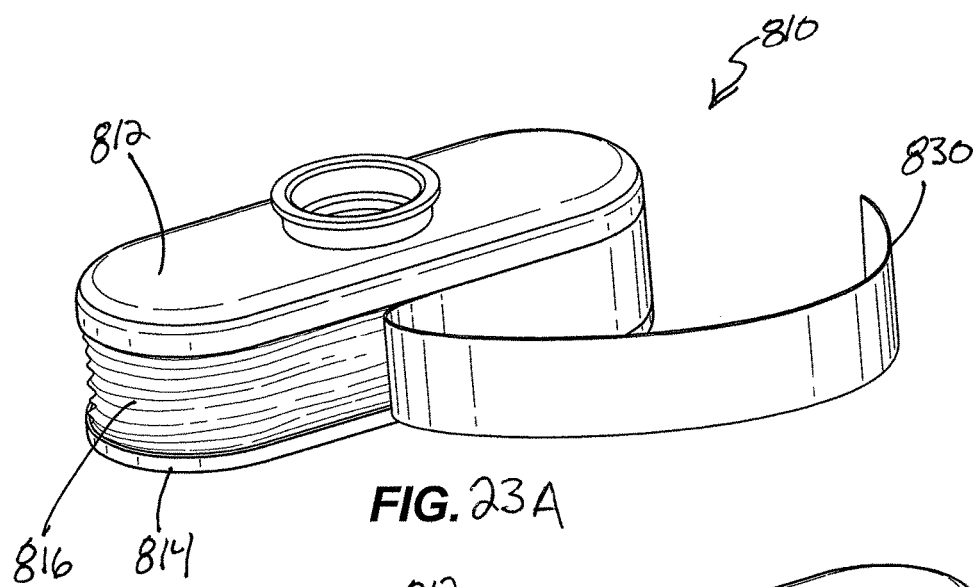
FIG. 23A is a perspective view of a filter in a collapsed position according to another embodiment.
Figure 23B:
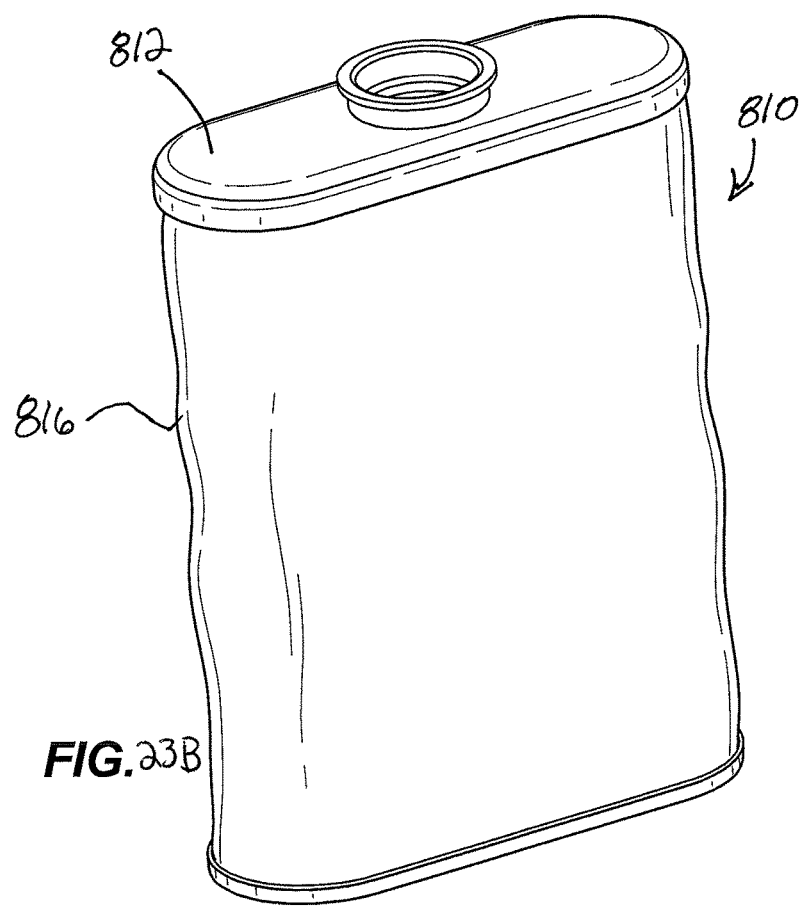
FIG. 23B is a perspective view of the filter of FIG. 23A in an expanded position.

FIGS. 23A and 23B illustrate a filter 810 according to another embodiment. The filter 810 includes features similar to the filters discussed above and only some differences between the filters will be discussed. In the illustrated embodiment, the filter 810 includes an upper housing 812 and a lower housing 814 and either or both of the upper and lower housings may be generally flat or may have an inner volume. The filter 810 further includes an intermediate portion 830, and in the collapsed position, the filter media 816 is virtually entirely received between the housings 812, 814 and surrounded and enclosed by the intermediate portion 830. In the illustrated embodiment, the intermediate portion 830 is a tear-away style component that the user removes (as illustrated in FIG. 23A) from connection with both housings 812, 814 before using the filter 810. In some embodiment, the intermediate portion 830 can be formed by paper, film, tape, paperboard, a sleeve, or other suitable components. In one alternative, the intermediate portion and the lower housing are combined into one removable or tear-away component, with the bottom of the filter media being closed with a seam.

Figure 24A:
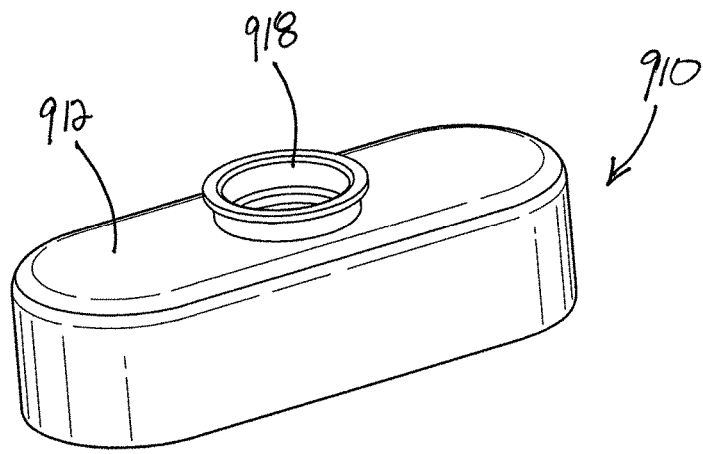
FIG. 24A is a perspective view of a filter in a collapsed position according to another embodiment.
Figure 24B:
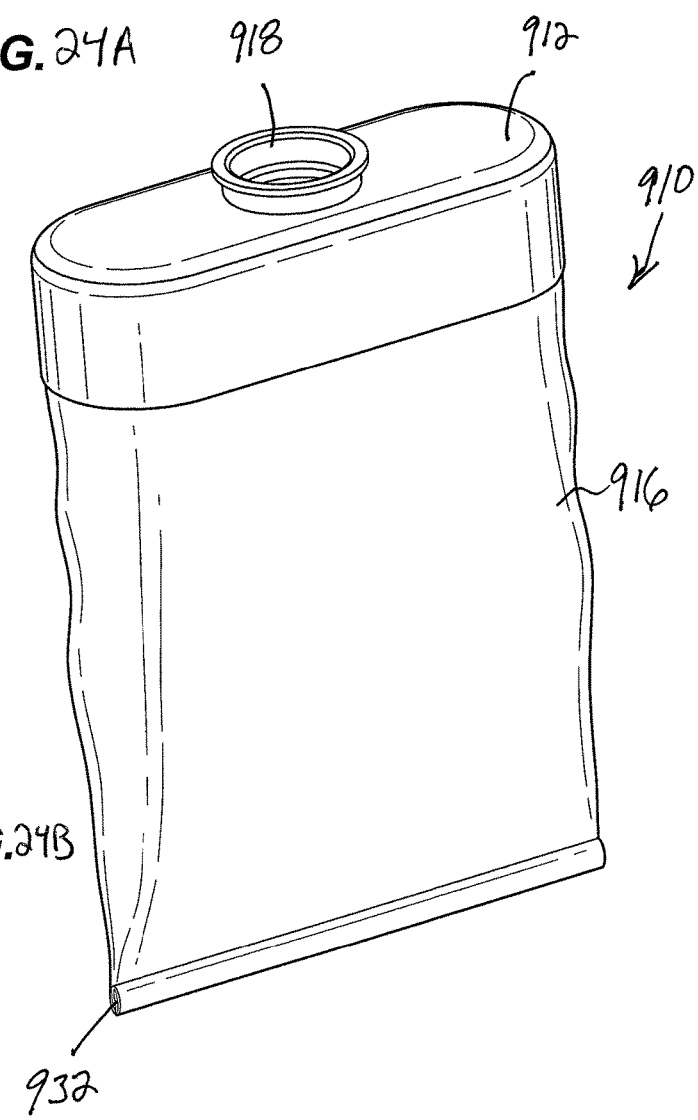
FIG. 24B is a perspective view of the filter of FIG. 24A in an expanded position.

FIGS. 24A and 24B illustrate a filter 910 according to another embodiment. The filter 910 includes features similar to the filters discussed above and only some differences between the filters will be discussed. The filter 910 includes an upper housing 912 similar to the housing 412 of the filter 410 of FIGS. 18A and 18B. The filter 910 further includes a lower end 932 of the filter media 916 that is closed with a seam, illustrated in FIG. 24B as a flat seam or rolled seam. In the collapsed position, the filter media 916 is entirely received in the inner volume of the upper housing 912. In some embodiments, the filter media 916 is enclosed in the collapsed position in the upper housing 912 by a closure device on the bottom of the upper housing 912. The closure device can include film, foil, paper, a cap, tape, bag, sleeve, or other suitable devices holding the filter media 916 and the upper housing 912 in the collapsed position. The closure device may include a perforation, slit, tear line, or hinge that allows the filter media 916 to move to the expanded position. In some embodiments, the closure device or cover would remain in place during and after installation of the filter 910 in the device. Then, the device may include a feature that automatically opens or shears the cover allowing the filter media to move to the expanded position. Alternatively or in addition, airflow from the device through the inlet opening 918 causes the filter media 916 to automatically expand and tear, push, and/or swing open the closure device, automatically expanding the filter 910. In other embodiments, the closure device may be removed, such as by peeling or tearing, by the user before or immediately after installing the filter 910.

Figure 25A:
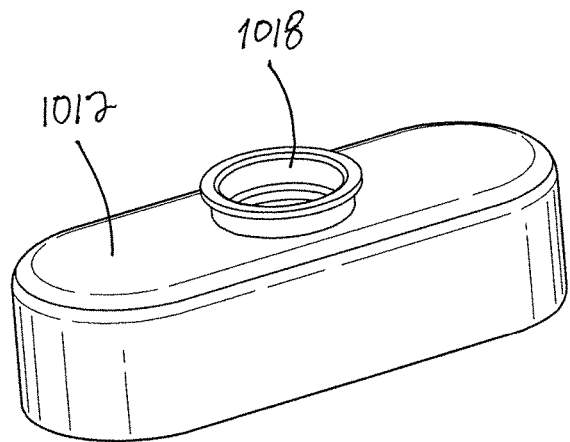
FIG. 25A is a perspective view of a filter in a collapsed position according to another embodiment.
Figure 25B:
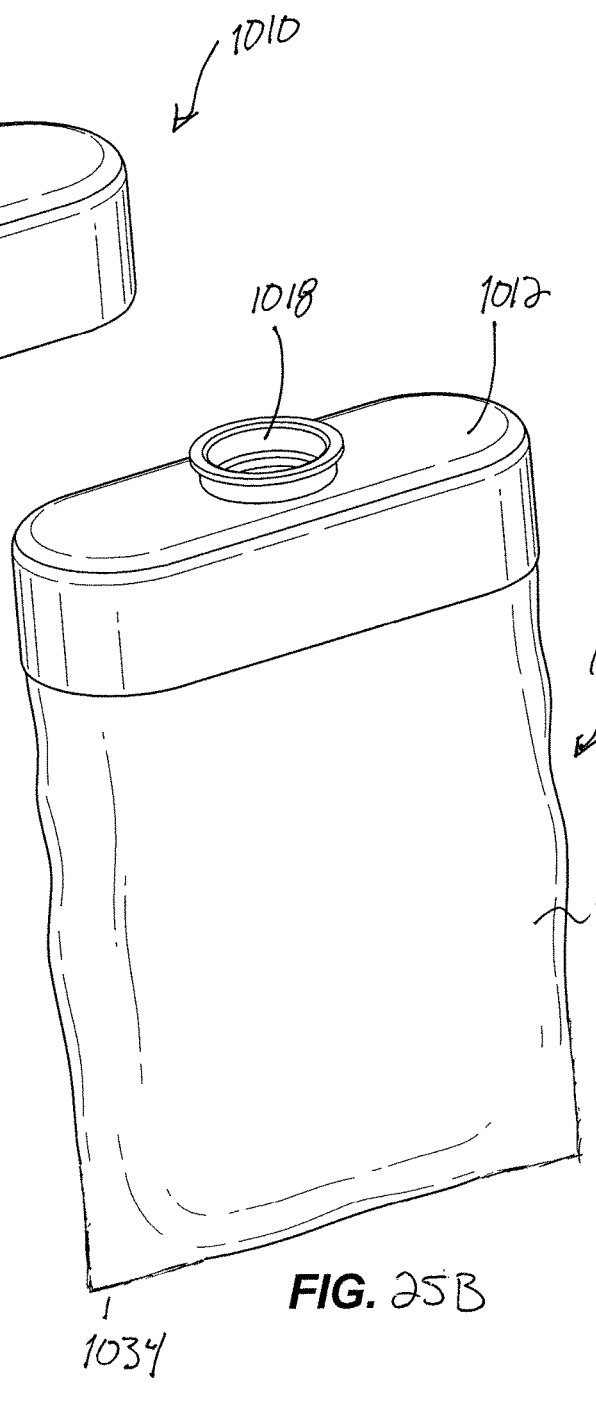
FIG. 25B is a perspective view of the filter of FIG. 25A in an expanded position.
Figure 25C:
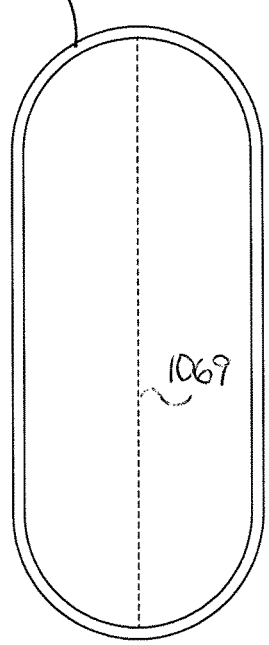
FIG. 25C is a bottom side view of the filter of FIG. 25A in the collapsed position.

FIGS. 25A-25C illustrate a filter 1010 according to another embodiment. The filter 1010 includes features similar to the filters discussed above and only some differences between the filters will be discussed. The filter 1010 includes an upper housing 1012 similar to the housing 412 of the filter 410 of FIGS. 18A and 18B or any other disclosed embodiment. The filter 1010 further includes a lower end of the filter media 1016 that includes a gusset bottom 1034. The gusset bottom 1034 can be formed from media material, thermoplastic molded or die cut material, film, foil, or other suitable materials. In some embodiments, the gusset bottom 1034 is air permeable. Also in some embodiments, the gusset bottom 1034 can be a self-standing type gusset. In the collapsed position, the filter media 1016 is at least partially received in the inner volume of the upper housing 1012. In some embodiments, the filter media 1016 is enclosed in the collapsed position in the upper housing 1012 by a closure device on the bottom of the upper housing 1012. The closure device can include film, foil, paper, a cap, tape, bag, sleeve, or other suitable devices holding the filter media 1016 and the upper housing 1012 in the collapsed position. The closure device may include a perforation 1069, slit, tear line, or hinge that allows the filter media 1016 to move to the expanded position. In some embodiments, the closure device or cover would remain in place during and after installation of the filter 1010 in the device. Then, the device may include a feature that automatically opens or shears the cover. Alternatively or in addition, airflow from the device through the inlet opening 1018 causes the filter media 1016 to automatically expand and tear, push, and/or swing open the closure device, automatically expanding the filter 1010. In other embodiments, the closure device may be removed, such as by peeling or tearing, by the user before or immediately after installing the filter 1010.

Figure 26A:
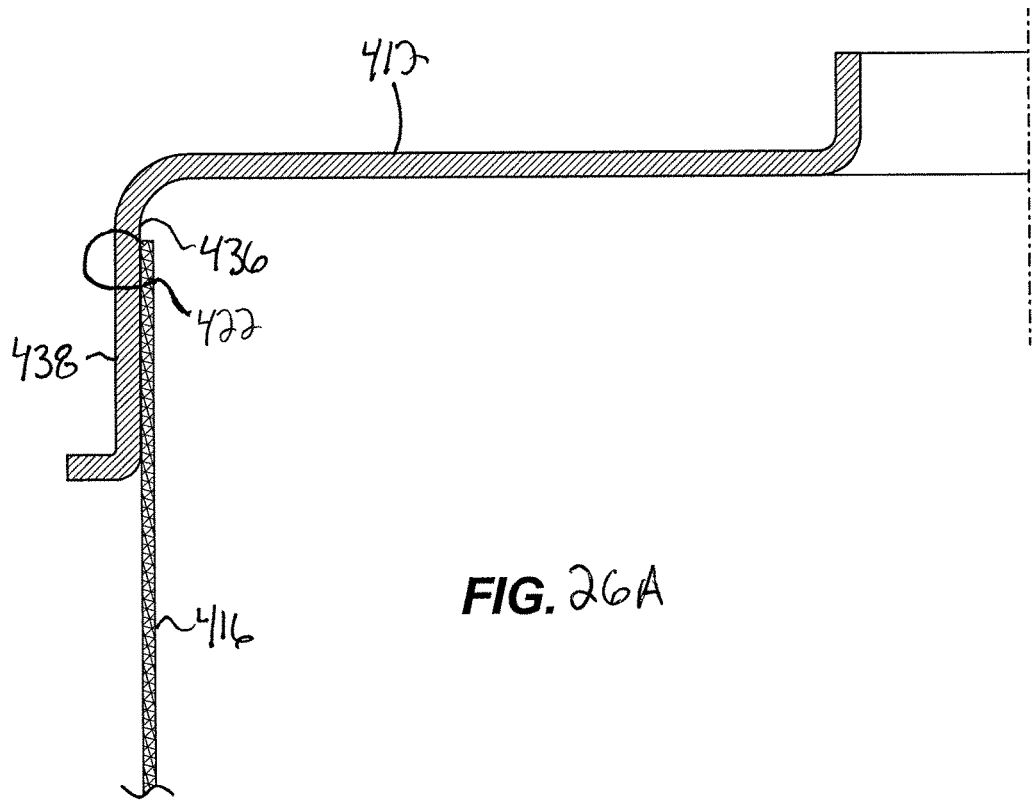
FIG. 26A is a cross-sectional view of a filter according to another embodiment.
Figure 26B:
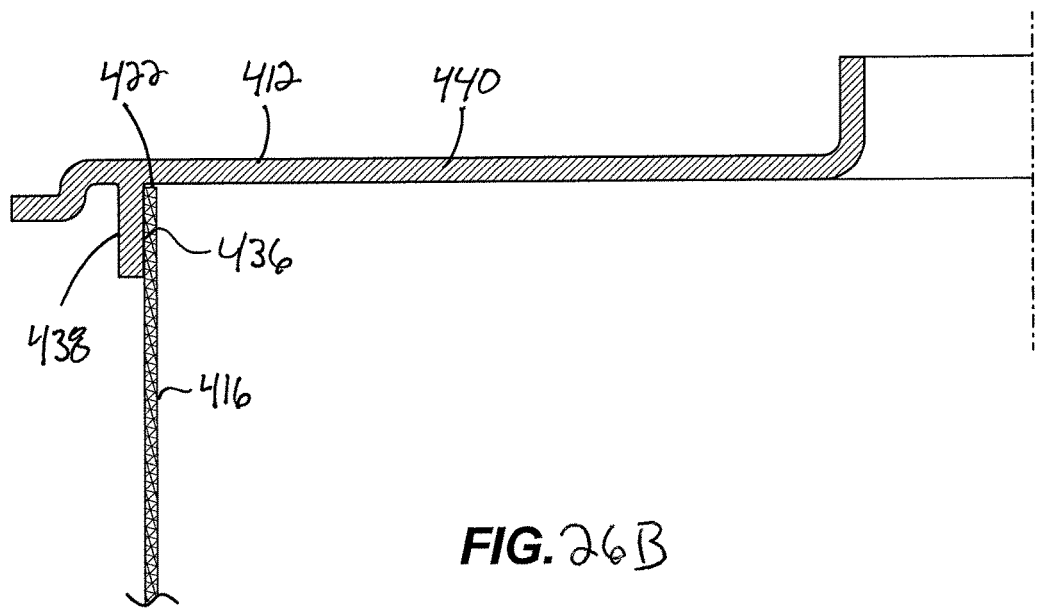
FIG. 26B is a cross-sectional view of a filter according to another embodiment.

FIG. 26A illustrates one possible way to attach the filter media 416 to the upper housing 412 (or any of the upper housings described herein). In the embodiment of FIG. 26A, the filter media 416 is welded onto an inside surface 436 of a sidewall 438 of the upper housing 412 at the first end 422 of the filter media 416. The media 416 can also be attached to the housing 412 using adhesive. In other embodiments, including when the upper housing 412 is formed from thermoplastic, the housing 412 may be overmolded onto the filter media 416. FIG. 26B illustrates the attachment described above with regard to FIG. 26A except that the housing 412 has a different shaped sidewall 438 and the end 422 of the filter media 416 abuts a top wall 440 of the housing 412. In the embodiments illustrated in FIGS. 26A and 26B, the attachment is generally radial or transverse to the direction of the filter media, with a mandrel, horn, or other attachment process support being provided through the lower end of the filter prior to the lower end being closed.

Figure 27B:
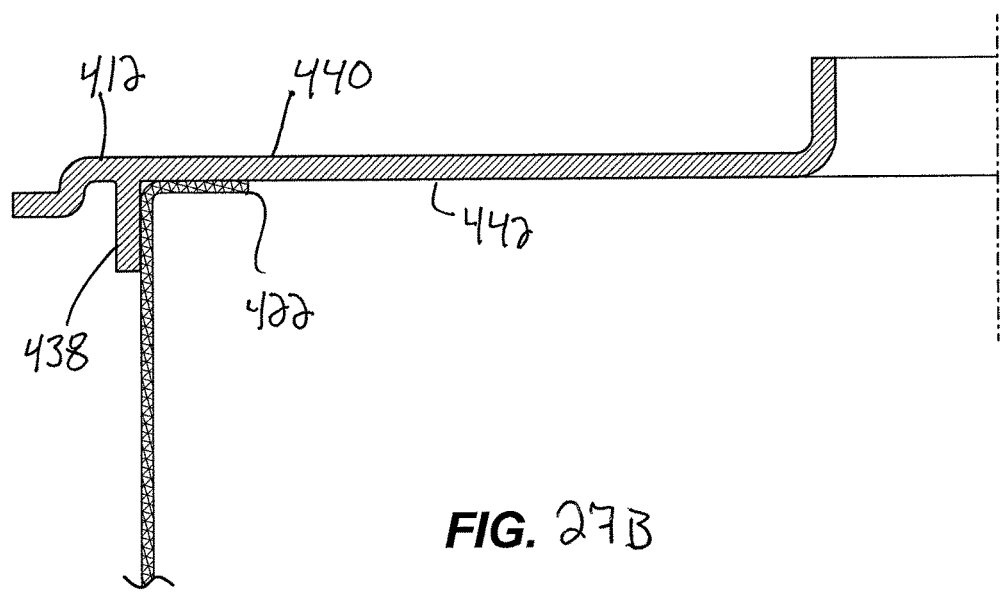
FIG. 27B is a cross-sectional view of a filter according to another embodiment.

FIG. 27A illustrates another possible way to attach the filter media 416 to the upper housing 412 (or any of the upper housings described herein). In the embodiment of FIG. 27A, the filter media 416 is welded onto an inside surface 442 of the top wall 440 of the upper housing 412 at the first end 422 of the filter media 416. Alternatively, the media 416 can be attached to the housing 412 using adhesive. In other embodiments, not shown, when the upper housing 412 is formed from thermoplastic, the housing 412 may be overmolded onto the filter media 416. FIG. 27B illustrates the attachment described above with regard to FIG. 27A except that the housing 412 has a different shaped sidewall 438. In the embodiments illustrated in FIGS. 27A and 27B, the attachment is generally axial or along the direction of the filter media, with a mandrel, horn, or other attachment process support being provided through the lower end of the filter prior to the lower end being closed.

Figure 28C:
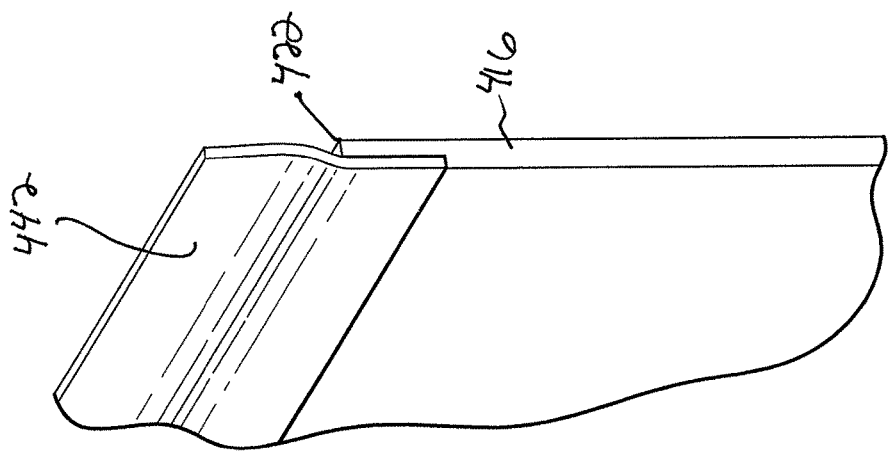
FIG. 28C is a perspective view of filter media for use in a filter.
Figure 28B:
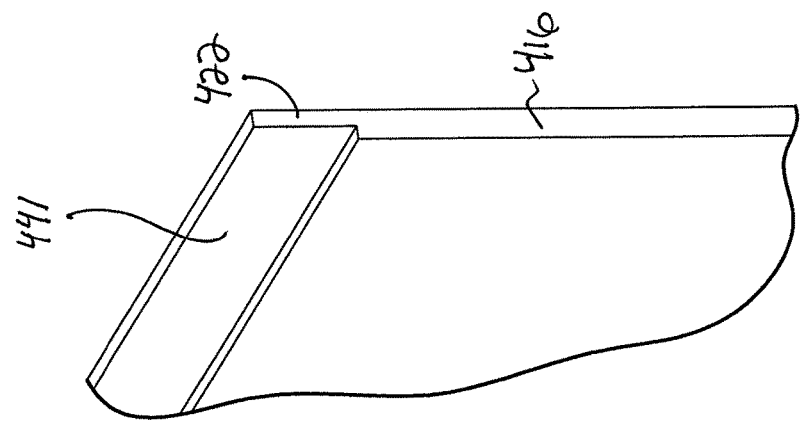
FIG. 28B is a perspective view of filter media for use in a filter.
Figure 28A:
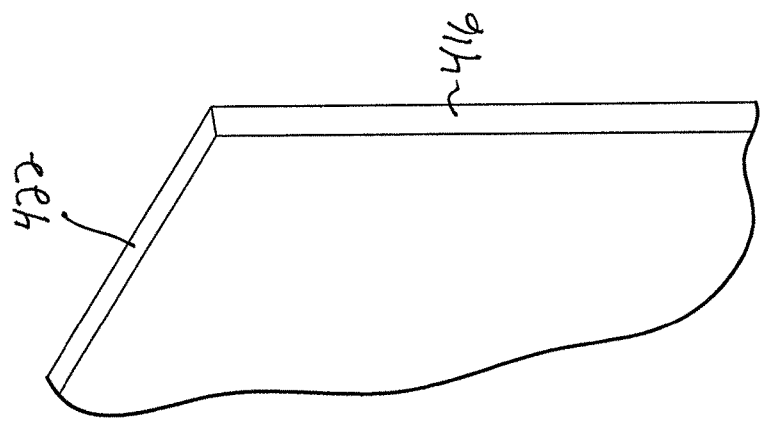
FIG. 28A is a perspective view of filter media for use in a filter.

FIGS. 28A-28C illustrate how the first end 422 of the filter media 416 may be prepared before attaching the filter media 416 to the housing 412 (similarly, how the second end of the filter media 416 could be prepared before attachment to the lower housing 414). FIG. 28A illustrates the first end 422 of the filter media 416 in its original thickness and the first end 422 can be attached to the housing 412 in its original thickness. Alternatively, as illustrated in FIG. 28B, the filter media 416 can be compressed along the first end 422 to create an area 441 of reduced thickness and increased density. The area 441 of reduced thickness is where the welding or overmolding to the housing 412 will be made. FIG. 28C illustrates another embodiment where a secondary strip of material 442 is welded other otherwise attached to the end 422 of the filter media 416. Then, the secondary strip of material 442 is welded, overmolded, or otherwise attached to the housing 412. In some embodiments, the secondary strip of material 442 includes a film and/or extrusion and can be applied to one or both sides of the filter media 416.

Figure 30:
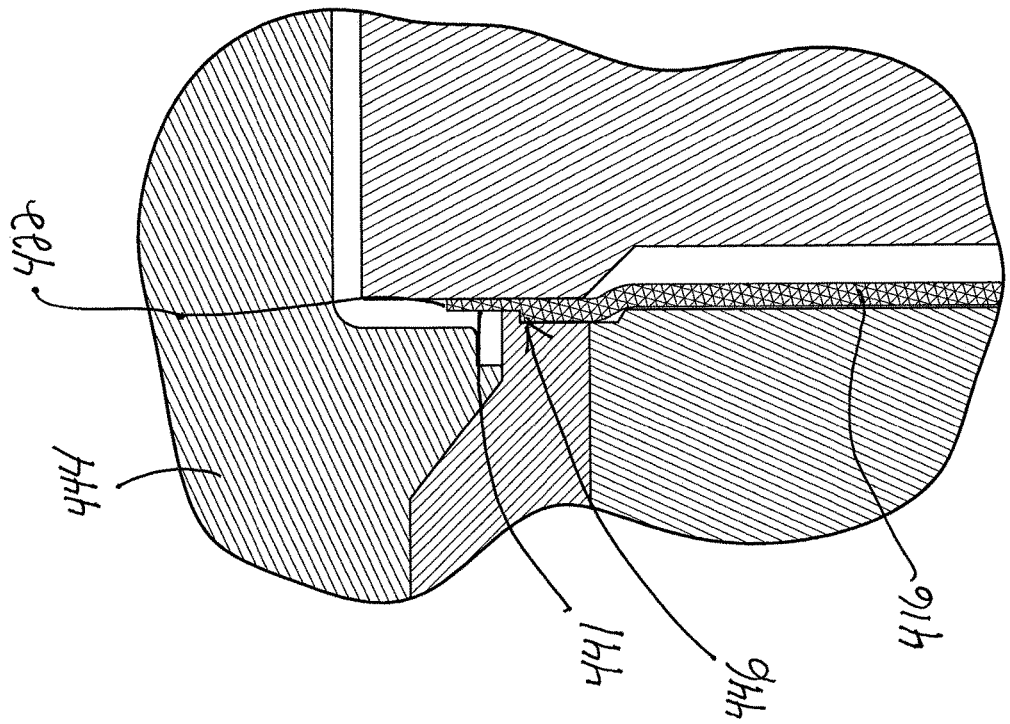
FIG. 30 is a cross-sectional view further illustrating the method of FIG. 29.
Figure 29:
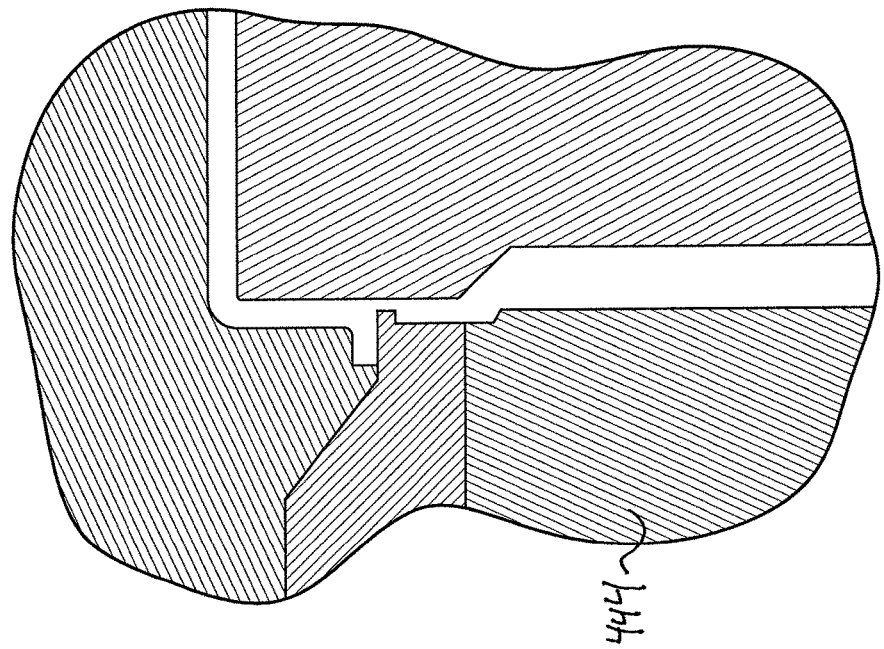
FIG. 29 is a cross-sectional view illustrating a method of manufacturing a filter.

FIGS. 29 and 30 illustrate one possible method of attaching the housings 412, 414 (or other housings discussed herein) onto the filter media 416 by overmolding. As shown in FIG. 30, the filter media 416 is placed into the mold 444 over the mold core being provided through the lower end of the filter prior to the lower end being closed. Then, the material of the housings 412, 414 is injected over the filter media 416. In the illustrated method of FIG. 30, the filter media 416 having the reduced thickness 441 at the end 422 is utilized. The mold 444 shuts off or closes against the media 416 at the area 441 of reduced thickness (near area of arrow 446 in FIG. 30). The injected material adheres to the filter media 416 along the area of reduced thickness 441 to attach the filter media 416 to the housings 412, 414. In various alternatives, filter media having end treatment shown in FIGS. 28A, 28B, and 28C may be utilized.

In another alternative, as discussed with reference to FIG. 18C, the filter media 416 may be divided into at least two portions, with the first portion of the filter media 416 being attached to the upper housing 412. Attaching a smaller portion of media to the upper may be useful in handing the filter media in a welding or molding process where internal support is needed. Then, after attachment of the first portion to the upper housing, the second piece of filter media 416' is attached to the first portion of filter media 416 using traditional bonding, sewing, or welding techniques. In one embodiment, not shown, the panel 428 is attached directly to the upper housing by welding, overmolding, adhesive, or other technique, and the filter media 416 is attached to the panel.

Figure 31A:
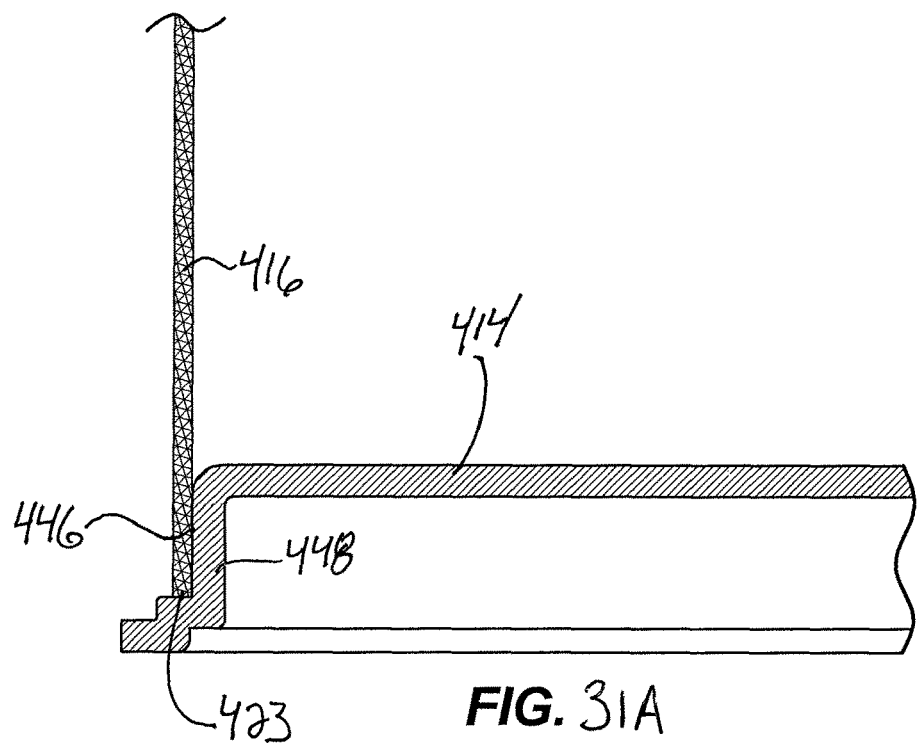
FIG. 31A is a cross-sectional view of a filter according to another embodiment.
Figure 31B:
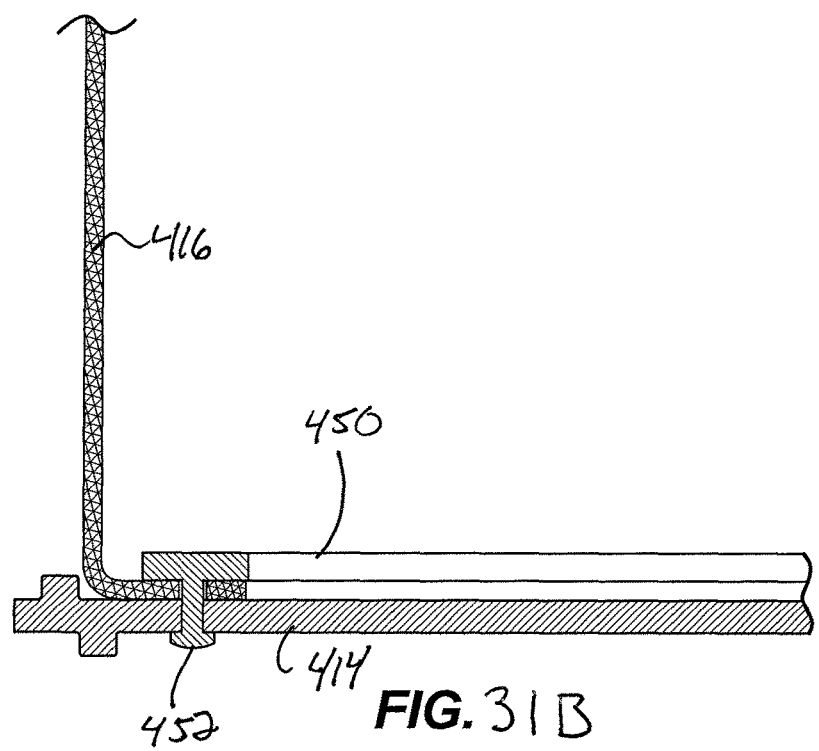
FIG. 31B is a cross-sectional view of a filter according to another embodiment.

FIG. 31A illustrates a possible way to attach the filter media 416 to the lower housing 414 (or any of the lower housings described herein). In the embodiment of FIG. 31A, the filter media 416 is welded onto an outside surface 446 of a sidewall 448 of the lower housing 414 at the second end 423 of the filter media 416. The filter media 416 can also be attached to the housing 414 using adhesive. FIG. 31B illustrates one possible way to attach the filter media 316 to a flat lower housing 314 (similarly could be used to attach to a flat upper housing 412 or any of the housings described above). A ring 450 optionally having projections 452 may be fitted to capture the lower end of the filter media 416 between the ring and the housing 414 and may be heat staked or otherwise fastened to attach the filter media 416 and the housing 414.

Figure 32:
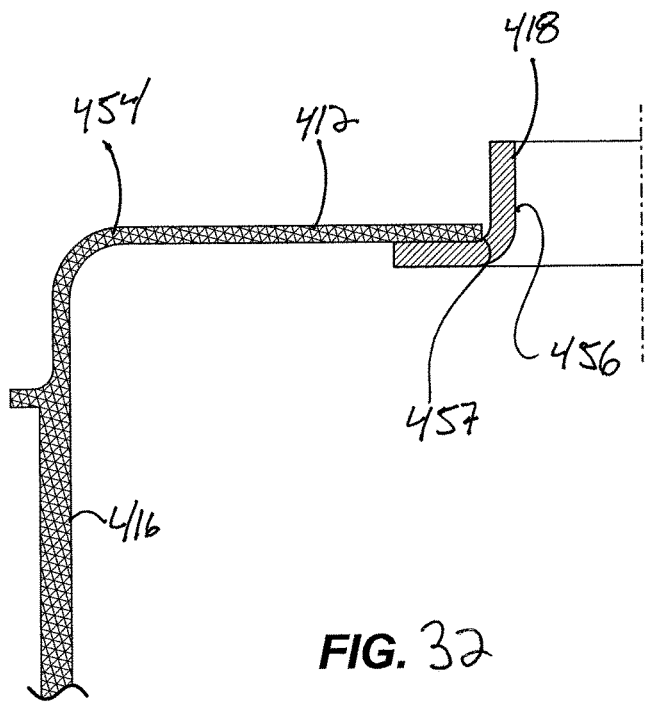
FIG. 32 is a cross-sectional view of a filter according to another embodiment.

FIG. 32 illustrates an alternative embodiment where a portion 454 of the upper housing 412 is formed by the filter media 416, generally by making the filter media 416 in the portion 454 more rigid or stiffer than the other areas of the filter media 416. The portion 454 is stiffened by compression molding, vacuum thermoforming, or a combination of both, and/or coating/impregnating the portion 454 with thermoset, thermoplastic, or other material to make a rigid or semi rigid upper portion having a desired shape made with the filter media 416. An inlet piece 456, including the inlet opening 418, is inserted through an aperture 457 of the portion 454. The inlet piece 456 can be attached by welding or adhesive. In the illustrated embodiment, the inlet piece 456 is attached to the inside of the portion 454 and in other embodiments, the inlet piece 456 may be attached to the outside of the portion 454. In another embodiment, the inlet piece is overmolded onto the filter media before, during, or after the stiffening operation.

Figure 33:
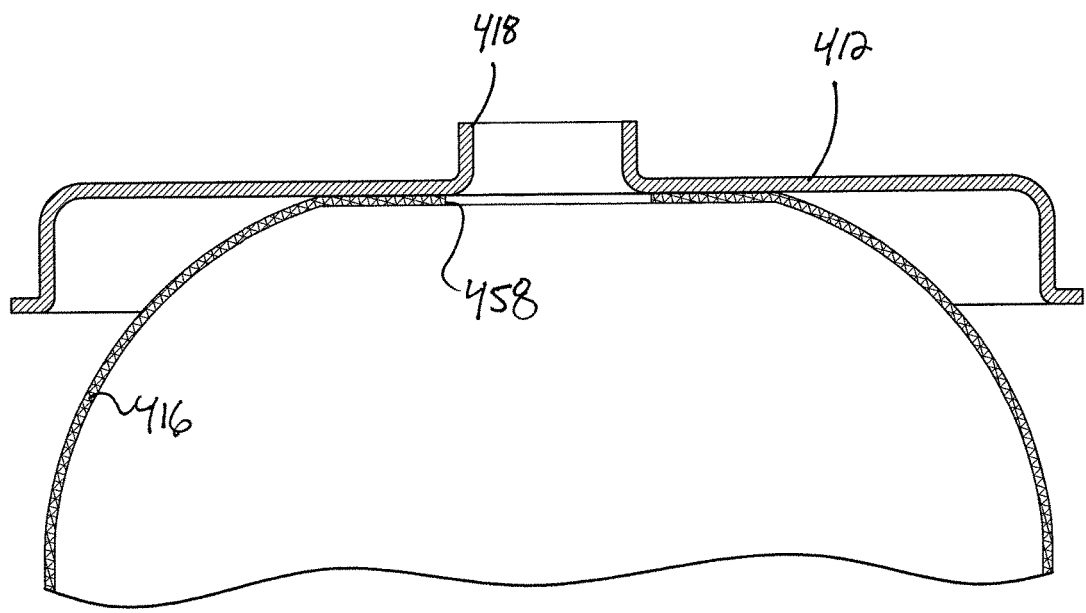
FIG. 33 is a cross-sectional view of a filter according to another embodiment.

FIG. 33 illustrates an alternative embodiment where the filter media 416 is formed with a generally closed end except for aperture 458. Then, the filter media 416 is attached to the housing 412 with the aperture 458 aligned with the inlet opening 418. The attachment could be made by welding or adhesive around the aperture 458.

Figure 34:
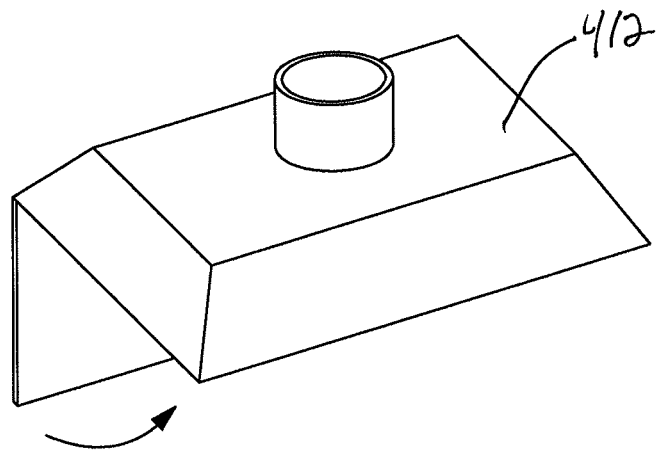
FIG. 34 is a perspective view of a housing for use in a filter.
Figure 35:
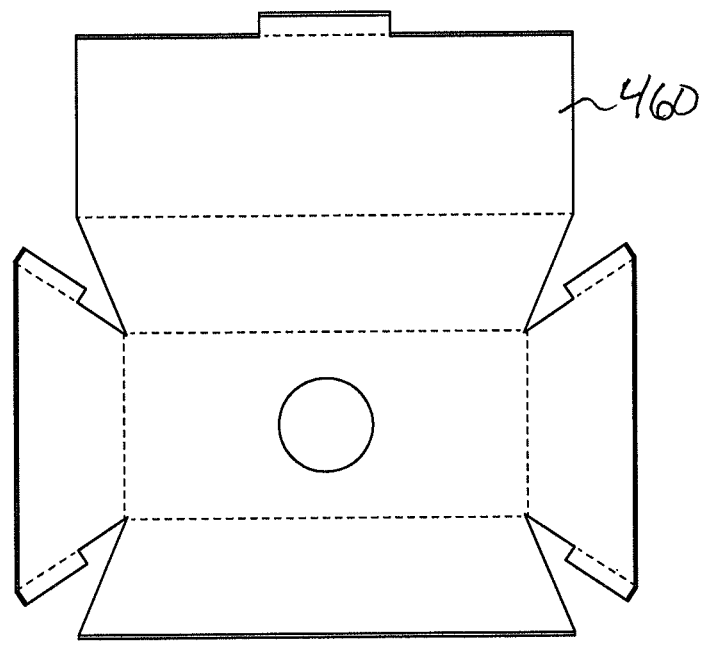
FIG. 35 is a bottom side view of the housing of FIG. 34 before the housing is formed into the position illustrated in FIG. 34.

FIGS. 34 and 35 illustrate an alternative embodiment where the housing 412 or housing 414 are formed by folding a die cut shape 460 (FIG. 35). The shape 460 is die cut and then folded to create the housing 412 or 414. The filter media can be attached to the housings 412 or 414 by welding or adhesive. In other embodiments, the housing can be formed from a single piece hinged from a top piece. The top and bottom die cut pieces could be separated and then bonded to each other or separately to the filter media by the methods previously discussed.

Figure 36:
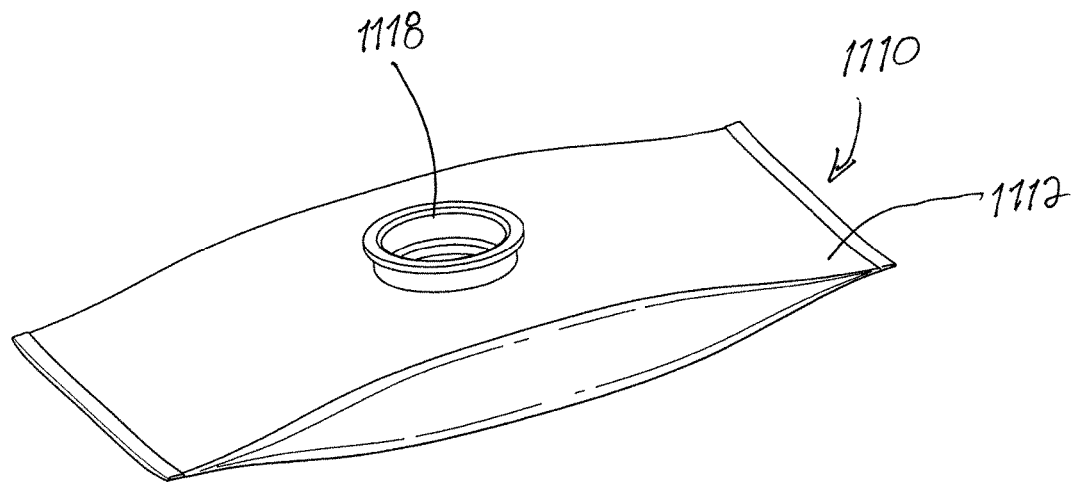
FIG. 36 is a perspective view of a filter according to another embodiment with the filter media in a collapsed position.
Figure 37:
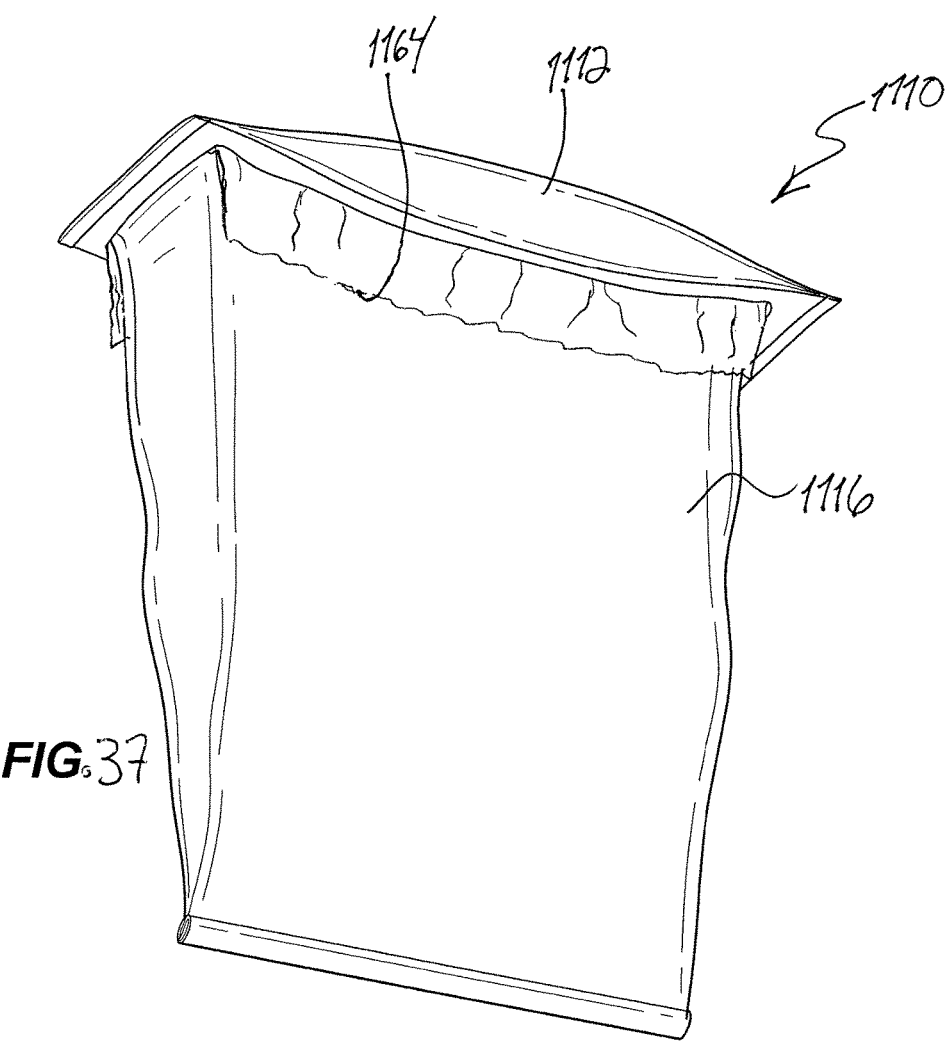
FIG. 37 is a perspective view of the filter of FIG. 36 illustrating the filter media in an expanded position.

FIGS. 36 and 37 illustrate a filter 1110 according to another embodiment. The filter 1110 includes features similar to the filters discussed above and only some differences between the filters will be discussed. The filter 1110 includes an upper housing 1112 that includes a bag 112. In one embodiment, filter media 1116 is formed as a complete enclosure with a desired inlet 1118. The filter media is compacted and inserted into an open end of the bag 1112 and then the bag sealed, or alternatively, the bag 1112 formed and sealed around the compacted media. Optionally, the bag 1112 is attached to the filter material around the inlet 1118. The bag 1112 can be formed from foil, plastic, paper, or other suitable materials. The bag 1112 includes a tear-out bottom 1164 opposite the inlet 1118 at the top of the bag 1112. In some applications, the bag 1112 is installed into the device with the filter media 1116 in the collapsed position (FIG. 36). Then, when the device is used or turned on, the filter media 1116 automatically breaks through the bottom 1164 of the bag 1112 because of the airflow through the inlet 1118. Alternatively, the bag includes a portion that the user opens before loading into a device, such as a tear-away portion, tear or cut line, or other opening. In yet another alternative, a mechanism may be used to push or pull one end of the filter away from the other moving the filter to the expanded position.

Although the invention has been described in detail with reference to certain preferred embodiments, variations and modifications exist within the scope and spirit of one or more independent aspects of the invention as described.

What is claimed is:
1. A handheld vacuum cleaner comprising:
   a suction inlet;
   a main body and a handle defined by a portion of the main body;
   a motor disposed within the main body operating a suction source; and
   a filter coupled to the main body, the filter configured to separate debris from a flow of fluid drawn through the suction inlet, the filter including
      a housing forming a first volume;
      a filter media forming a second inner volume, the filter media coupled to the housing such that the first and second inner volumes together at least partially define a collection container configured to store debris separated by the filter media from the flow of fluid;
      an inlet opening that extends through the housing to provide fluid communication into the collection container such that the flow of fluid with the debris can flow into the collection container and a relatively clean flow of fluid exits through the filter media.
2. The handheld vacuum cleaner of claim 1, wherein the filter is releasable from the main body without a user touching the filter.

3. The handheld vacuum cleaner of claim 1, further comprising a conduit in fluid communication with the suction inlet, wherein the conduit extends into the collection container coupling the filter to the conduit.

4. The handheld vacuum cleaner of claim 3, wherein the filter includes a valve releasably connected to the inlet opening, wherein the conduit opens the valve when the conduit extends into the collection container.

5. The handheld vacuum cleaner of claim 4, wherein the valve includes an engagement member on an outer periphery to engage the inlet opening, and a pocket that receives and couples to the conduit.

6. The handheld vacuum cleaner of claim 1, further comprising an actuator that is operable to uncouple the filter from the main body.

7. The handheld vacuum cleaner of claim 6, wherein the actuator is operable such that a user can dispose of the filter without touching the filter.

8. The handheld vacuum cleaner of claim 1, further comprising an outer housing surrounding the filter, where the outer housing includes a porous structure forming an airflow exhaust outlet.

9. The handheld vacuum cleaner of claim 1, further comprising a battery that is at least partially disposed within the handle.

10. The handheld vacuum cleaner of claim 1, wherein the filter is provided downstream of the suction source.

11. The handheld vacuum cleaner of claim 1, further comprising:
    a fan for creating suction through the suction inlet;
    a volute surrounding the fan, the volute upstream of the filter to direct debris from the suction inlet toward the filter.

12. The handheld vacuum cleaner of claim 11, further comprising a conduit in fluid communication with the suction inlet and connected to the filter.

13. The handheld vacuum cleaner of claim 12, wherein the volute is operably disposed between the suction inlet and the conduit.

14. The handheld vacuum cleaner of claim 11, wherein the motor and the suction inlet are co-axial.

15. The handheld vacuum cleaner of claim 11, wherein the volute includes an inner periphery that is spaced circumferentially away from an outer periphery of the fan.

16. The handheld vacuum cleaner of claim 11, wherein the suction inlet is transverse to a plane defined by the fan.

17. The handheld vacuum cleaner of claim 11, where the volute further comprises a volute inlet, the volute inlet being aligned with the suction inlet.

18. The handheld vacuum cleaner of claim 11, wherein the volute is operably disposed between the suction inlet and the fan dirt collection container.

19. The handheld vacuum cleaner of claim 1, further comprising,
    the suction inlet defining an inlet axis;
    a conduit in fluid communication with the suction inlet, the conduit defining a conduit axis transverse to the inlet axis; and
    the motor defining a rotational axis that is generally aligned with the inlet axis.

20. The handheld vacuum cleaner of claim 19, further comprising a user interface disposed on the main body positioned on a user-facing surface.

21. The handheld vacuum cleaner of claim 20, wherein the user interface is adjacent the handle such that a user can operate the user interface with the same hand that is grasping the handle.

22. The handheld vacuum cleaner of claim 19, wherein the user interface is operable to control the motor.

23. The handheld vacuum cleaner of claim 19, further comprising a fan that is driven by the motor for creating suction through the suction inlet, the fan defines a plane, and wherein the conduit axis is along the plane of the fan.

24. The handheld vacuum cleaner of claim 19, further comprising a battery, wherein the battery is at least partially disposed within the handle.

25. The handheld vacuum cleaner of claim 1, wherein the housing includes an upper housing configured to be supported by the handheld vacuum cleaner, wherein an end of the filter media extends away from the upper housing a desired length forming an overlapping filter media section.

* * * * *